(12) United States Patent
Marumoto et al.

(10) Patent No.: US 8,328,329 B2
(45) Date of Patent: Dec. 11, 2012

(54) RECORDING APPARATUS AND RECORDING METHOD

(75) Inventors: Yoshitomo Marumoto, Yokohama (JP); Takaharu Aotani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 13/152,985

(22) Filed: Jun. 3, 2011

(65) Prior Publication Data

US 2011/0227982 A1   Sep. 22, 2011

Related U.S. Application Data

(63) Continuation of application No. PCT/JP2009/071713, filed on Dec. 18, 2009.

(30) Foreign Application Priority Data

Dec. 19, 2008 (JP) ................................ 2008-324128

(51) Int. Cl.
*B41J 2/145* (2006.01)
*B41J 2/15* (2006.01)
(52) U.S. Cl. ....................................................... 347/41
(58) Field of Classification Search ..................... 347/41
See application file for complete search history.

(56) References Cited

U.S. PATENT DOCUMENTS

| | | | | |
|---|---|---|---|---|
| 6,206,502 B1 * | 3/2001 | Kato et al. | ...................... | 347/41 |
| 6,474,777 B1 * | 11/2002 | Fujita et al. | ...................... | 347/41 |
| 6,866,360 B2 * | 3/2005 | de Pena | .......................... | 347/19 |
| 6,874,864 B1 | 4/2005 | Maeda et al. | | |
| 7,152,950 B2 | 12/2006 | Takekoshi et al. | | |
| 2005/0007416 A1 | 1/2005 | Takekoshi et al. | | |
| 2010/0110131 A1 | 5/2010 | Nashimoto | | |

FOREIGN PATENT DOCUMENTS

| | | |
|---|---|---|
| JP | 11-245384 A | 9/1999 |
| JP | 2000-108322 A | 4/2000 |
| JP | 2002-96455 A | 4/2002 |
| JP | 2004338312 A | 12/2004 |
| JP | 2008230082 A | 10/2008 |

* cited by examiner

*Primary Examiner* — Julian Huffman
(74) *Attorney, Agent, or Firm* — Fitzpatrick, Cella, Harper & Scinto

(57) ABSTRACT

In a mask pattern used in effecting multi-path recording, (A) a recording permission ratio in each pixel row of a non-boundary area of a first pattern portion corresponding to a first nozzle block is substantially a first value, and a recording permission ratio in each pixel row of a non-boundary area of a second pattern portion corresponding to a second nozzle block adjacent the first nozzle block is substantially a second value, and (B) in a boundary area including a boundary between the first pattern portion and the second pattern portion, the recording permission ratio in each pixel row is between the first value and the second value, and the recording permission ratios in each pixel line are made different depending on a position with respect to a scanning direction.

8 Claims, 24 Drawing Sheets

IMAGE DEFECTS  ◯: NON-CONSPICUOUS  ✕: CONSPICUOUS

| PATTERN | INTER-BAND | IN-BAND | CON. STRIPE |
|---|---|---|---|
| FLAT MASK | ✕ | ◯ | ✕ |
| GRADATION MASK | ◯ | ✕ | ◯ |
| STEPWISE MASK | ◯ | ◯ | ✕ |
| MASK OF THIS INV. | ◯ | ◯ | ◯ |

Fig. 18

RECORDING APPARATUS AND RECORDING METHOD

The present application is a continuation of PCT/JP2009/071713, filed Dec. 18, 2009, which claims priority to JP 2008-324128 filed Dec. 19, 2008, the entire disclosure of each of which is incorporated by reference herein.

FIELD OF THE INVENTION

The present invention relates to a serial type recording apparatus wherein an image is formed stepwisely on a recording material by repeating movement the recording scan) with recording by recording head and a feeding operation of the recording material.

BACKGROUND ART

In the serial type ink jet recording apparatus, a multi-path recording method is generally used to reduce connection stripes appearing a boundary portion between adjacent recording scans and a density unevenness resulting from a variation in ink ejection properties of respective nozzles. With such a multi-path recording, it is known that the evenness of the output images is improved with increase of the number of the multi-paths (the number of recording scans for a unit area), whereas on the other hand, the throughput decreases therewith. Therefore, a recording method with which high image quality images are outputted with as small number of multi-paths as possible is desired.

A method with which the throughput is improved, there is a bi-directional multi-path recording in which the recording operation is carried out both in a forward path and a backward path of a carriage carrying the recording head. Using the bi-directional multi-path recording, the number of recording scans is approximately one half that in the unidirectional recording with the same number of the multi-paths, and therefore, the time required for the recording operation can be reduced. However, it has been confirmed that the bi-directional multi-path recording may cause another unevenness between bands due to a variation in a density, a hue or a glossiness occurring at intervals corresponding to a feeding distance of the recording material. In the present Specification, the new unevenness between adjacent bands occurring in the bi-directional multi-path recording is called inter-band unevenness.

Parts (a) and (b) of FIG. 1 are schematic views illustrating specifically a cause and a phenomenon of the inter-band unevenness. Part (a) of FIG. 1 illustrates the case of four path bi-directional recording using a recording head 1000 including four arrays of nozzle groups for ejecting cyan ink (C), magenta ink (M), yellow ink (Y) and black ink (K), respectively. The recording head 1000 carries out the forward path recording scan and the backward path recording scan alternately in a direction of X, during which between the recording scans, the recording head 1000 moves relative to the recording material in a direction of Y by the distance corresponding to a width of a unit area each time.

Here, a left-hand end portion of a first band having a unit area width, first. At this time, the area receives the inks in the order of C-M-Y-K in the first recording scan, and then after a relatively long time corresponding substantially to one reciprocal scanning operation of the recording head, it receives the ink in the order of K-Y-M-C. In a left-hand end portion of a second band adjacent to the first band, the area receives the inks in the order of K-Y-M-C, and then after a relatively short time corresponding substantially to a reverting operation of the recording head, it receives the ink in the order of C-M-Y-K. Thereafter, in the third band adjacent to the second band and odd number bands following the third band, the inks are applied in the same conditions as in the first band, and in the fourth band adjacent to the third band and even number bands following the fourth band, the inks are applied in the same conditions as in the second band. Thus, two kinds of bands having different order and intervals of the color ink applications to the recording material appear alternately in the Y direction. The different order and different intervals of the color ink applications influence quite significantly the density, the hue and/or the glossiness of the image formed on the recording material. As a result, the inter-band unevenness are remarkable in the image comprising the bands shown in part (b) of FIG. 1, which are different in the application order and/or timing.

In order to reduce the image defect of such an inter-band unevenness in the multi-path recording, it is effective to adjust a recording permission ratio of each nozzle of the recording head.

Here, the recording permission ratio is a ratio of the pixels for which the recording is permitted in one recording scan (movement) of the recording head, to a plurality of pixels included in a predetermined area. For example, a recording permission ratio of a nozzle is a ratio of the pixels in one nozzle passing by one movement (scanning) of the recording head, for which pixels the recording by the nozzle is permitted, to all the pixels of such a nozzle. The permission and non-permission of the recording for each pixel are ordinarily determined by a mask pattern prepared beforehand. Therefore, the recording permission ratio of each nozzle is determined by the mask pattern, and in the present Specification, the adjustment of the recording permission ratio means adjustment of an arrangement of the recording permission pixels in the mask pattern.

For example, Japanese Laid-open Patent Application 2000-108322 and Japanese Laid-open Patent Application 2002-96455 specifically disclose a structure in which by using the improved mask pattern so as to determine the recording permission ratios of the nozzles with a predetermined bias, connection stripes and density unevenness are less conspicuous even with a small number of multi-paths, is disclosed.

In the multi-path recording, in order to maintain an evenness of the image, it is effective to control the recording permission ratio in respective recording scans (nozzle block) by a method other than those disclosed in the Japanese publications. The appearing of the inter-band unevenness is different depending on various conditions such as the kind of the recording material, the kind of the ink, but the evenness of the image can be maintained if the recording permission ratio can be adjusted using a mask pattern in accordance with various conditions.

DISCLOSURE OF INVENTION

However, when the recording permission ratio is adjusted so as to suppress the inter-band unevenness, connection stripes or another unevenness appears within individual bands with the result that a preferable image cannot be provided, in some cases. For example, in order to make the recording permission ratio for a unit area of the recording material, the plurality of nozzles of the recording head are divided into blocks corresponding to the width of the unit area, and the recording permission ratios are set such that individual nozzle blocks have different recording permission ratios. In such a case, however, if there exists a relatively large difference in the recording permission ratios of a nozzle blocks, a portion where the recording permission ratio changes significantly appears linearly in the main scan direction with the result of conspicuous connection, in some cases.

Such connection stripes can be made less conspicuous, by making the change of the recording permission ratio in each of the nozzle blocks gradual, so that the change of the recording permission ratio at the boundary between the adjacent nozzle blocks is not extreme, as disclosed in Japanese Laid-open Patent Application 2002-96455.

However, if the recording permission ratios of the nozzles in a nozzle block is not substantially constant, another problem of the color unevenness or glossiness unevenness appearing within the unit area arises. Hereinafter, the unevenness caused by the recording permission ratios of the nozzles in a nozzle block being not substantially constant, is called in-band unevenness.

As will be understood, in the conventional bi-directional multi-path recording, it is not possible to simultaneously solve the problems of the inter-band unevenness, the connection stripe and the in-band unevenness.

The present invention is intended to solve the problems. Accordingly, it is an object of the present invention to provide a recording method and an ink jet recording apparatus capable of implementing the recording method with which the inter-band unevenness, the connection stripes and the in-band unevenness can be solved simultaneously.

According to an aspect of the present invention, there is provided a recording apparatus for effecting recording on a recording material using a recording head including a plurality of nozzles usable for the recording, the nozzles being arranged in a first direction, said recording apparatus comprising moving means for moving said recording head in a second direction crossing with the first direction; feeding means for feeding the recording material in the first direction by a distance corresponding to a width of one of a plurality of nozzle blocks into which said plurality of nozzles are divided, between movements of said recording; and control means executing the recording of said recording head during the movement of said recording head in accordance with image data corresponding to said nozzles and a mask pattern for masking the image data; wherein (i) said mask pattern includes at least a first pattern portion for masking the image data corresponding to each nozzle of a first nozzle block included in said plurality of nozzle blocks, and a second pattern portion for masking the image data corresponding to each nozzle of a second nozzle block adjacent said first nozzle block, (ii) a ratio of recording permission pixels in each pixel row extending in the second direction in a non-boundary area of said first pattern portion is substantially a first value, and a ratio of recording permission pixels in each pixel row extending in the second direction in a non-boundary area of said second pattern portion is substantially a second value which is different from a first value, (iii) in a boundary area including a boundary between said first pattern portion and said second pattern portion, a ratio of recording permission pixels in each pixel row extending in the second direction is between the first value and the second value, and the ratios of the recording permission pixels in a pixel line extending in the first direction are different depending on a position with respect to the second direction.

According to another aspect of the present invention, there is provided a recording method for effecting recording on a recording material using a recording head including a plurality of nozzles usable for the recording, the nozzles being arranged in a first direction, said recording method comprising: a moving step of moving said recording head in a second direction crossing with the first direction; a feeding step of feeding the recording material in the first direction by a distance corresponding to a width of one of a plurality of nozzle blocks into which said plurality of nozzles are divided, between movements of said recording; and a recording step of executing the recording of said recording head during the movement of said recording head in accordance with image data corresponding to said nozzles and a mask pattern for masking the image data; wherein (i) said mask pattern includes at least a first pattern portion for masking the image data corresponding to each nozzle of a first nozzle block included in said plurality of nozzle blocks, and a second pattern portion for masking the image data corresponding to each nozzle of a second nozzle block adjacent said first nozzle block, (ii) a ratio of recording permission pixels in each pixel row extending in the second direction in a non-boundary area of said first pattern portion is substantially a first value, and a ratio of recording permission pixels in each pixel row extending in the second direction in a non-boundary area of said second pattern portion is substantially a second value which is different from a first value, and (iii) in a boundary area including a boundary between said first pattern portion and said second pattern portion, a ratio of recording permission pixels in each pixel row extending in the second direction is between the first value and the second value, and the ratios of the recording permission pixels in a pixel line extending in the first direction are different depending on a position with respect to the second direction.

According to the present invention, the inter-band unevenness, the connection stripes and the in-band unevenness can be simultaneously reduced.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 18 illustrates a result of comparison in an image quality when the multi-path recording is carries out using the mask patterns shown in FIGS. 8-11.

DESCRIPTION OF THE PREFERRED EMBODIMENT

The preferred embodiments of the present invention will be described in detail.

Figure 2:
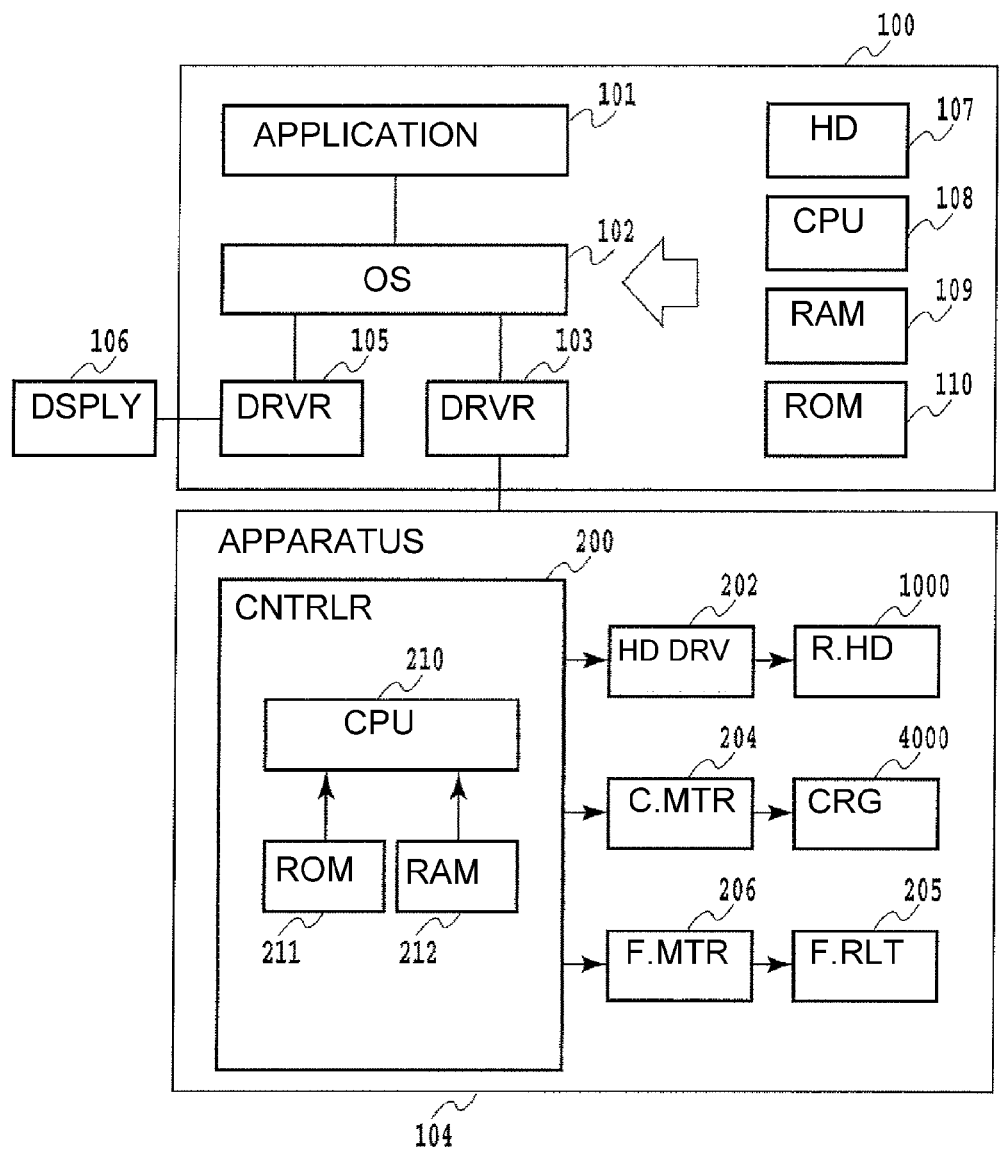
FIG. 2 is a block diagram illustrating structures of a host apparatus 100 and a recording apparatus 104 in a recording system to which the present invention is applicable.

FIG. 2 is a block diagram illustrating structures of a host apparatus 100 and a recording apparatus 104 constituting a recording system applicable to the present invention.

CPU108 operates software programs of an application 101, a printer driver 103 and a display driver 105 through an operating system 102 in accordance with various programs stored in a hard disk (HD) 107 and ROM 110. At this time, a RAM 109 functions as a work area when various processes are carried out. The display driver 105 produces image data to be displayed on a display 106. The printer driver 103 converts the image data to be supplied to OS102 from the application software 101 to multi-value or binary image data which can be received by the recording apparatus 104, and then send the converted data to the recording apparatus 104.

The recording apparatus 104 comprises a controller 200, a recording head 1000, a head driving circuit 202, a carriage 4000, a carriage motor 204, a feeding roller 205, a feeding motor 206 and so on. The head driving circuit 202 is a circuit for driving the recording head 1000, and drives the recording head 1000 to eject the ink. The carriage motor 204 is a motor for moving reciprocally the carriage 4000 for carrying the recording head 100. The feeding motor 206 is a motor for driving the feeding roller 205 for feeding a recording material. The controller 200 functions to control the entirety of the apparatus and comprises a CPU210 in the form of a microprocessor, a ROM 211 storing a control program, a RAM 212 for use by CPU at the time of image data processing and so on. The ROM 211 stores a control program and so on for controlling a mask pattern and a multi-path recording according to the present invention which will be described hereinafter. The controller 200 controls the carriage motor 204, the feeding motor 206 to execute the multi-path recording, and in addition generates image data corresponding to each scanning of the multi-path recording, for example. In more detail, the controller 200 reads a mask pattern out of the ROM 211 in accordance with a control program, and divides the image data corresponding to a unit area into image data to be recorded by nozzle blocks corresponding to respective scannings of the multi-path recording, using a mask pattern read out. Furthermore, the controller 200 controls the head driving circuit 202 so that the ink is ejected from the recording head 1000 in accordance with the divided image data.

Figure 3:
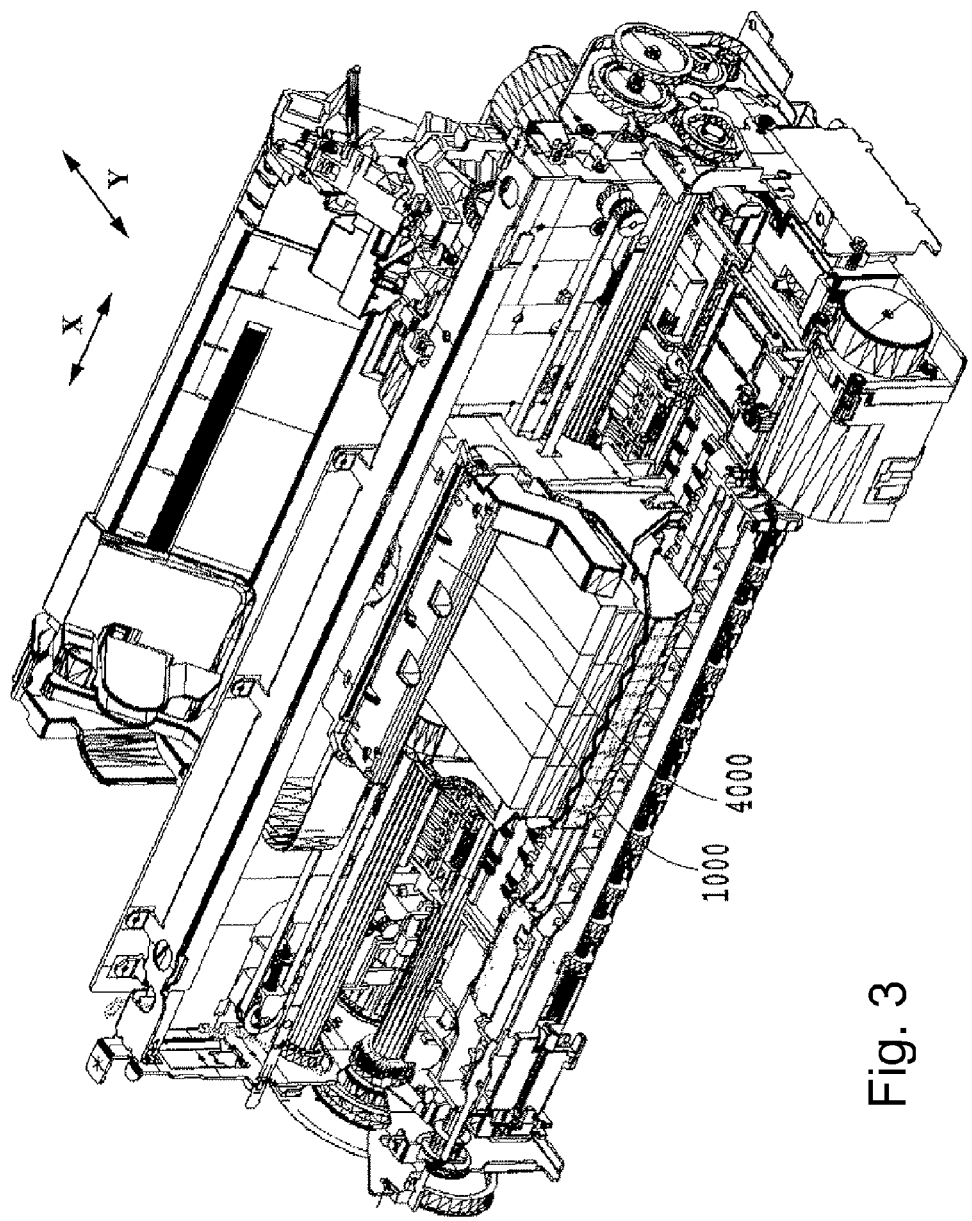
FIG. 3 is a perspective view illustrating a structure of the recording apparatus 104 employed in an embodiment of the present invention.

FIG. 3 is a perspective view illustrating a substantial structure of the recording apparatus 104 employed by this embodiment. The carriage 4000 as a moving means carries the recording head 1000 which is provided with four nozzle groups for ejecting cyan (C) ink, magenta (M) ink, yellow (Y) ink and black ink, respectively. An unshown control means including a controller and so on causes the recording head 1000 to execute the ink ejecting operation during movement of the carriage 4000 in the direction of X in accordance with the image data received from a host apparatus. When one recording scan by the recording head 1000 is completed, the recording material is fed in the direction of Y crossing the X direction, by unshown feeding means including a feeding roller or the like by an amount corresponding to the number of paths of the multi-path recording. Thereafter, the recording with head movement in the X direction (head moving direction) and the feeding in the Y direction are repeated, by which images are formed on the recording material sequentially. In this embodiment, a bi-directional multi-path recording type is used, wherein the ink ejecting operation is carries out both in a forward path direction and a backward path direction of the head movement.

Figure 4:
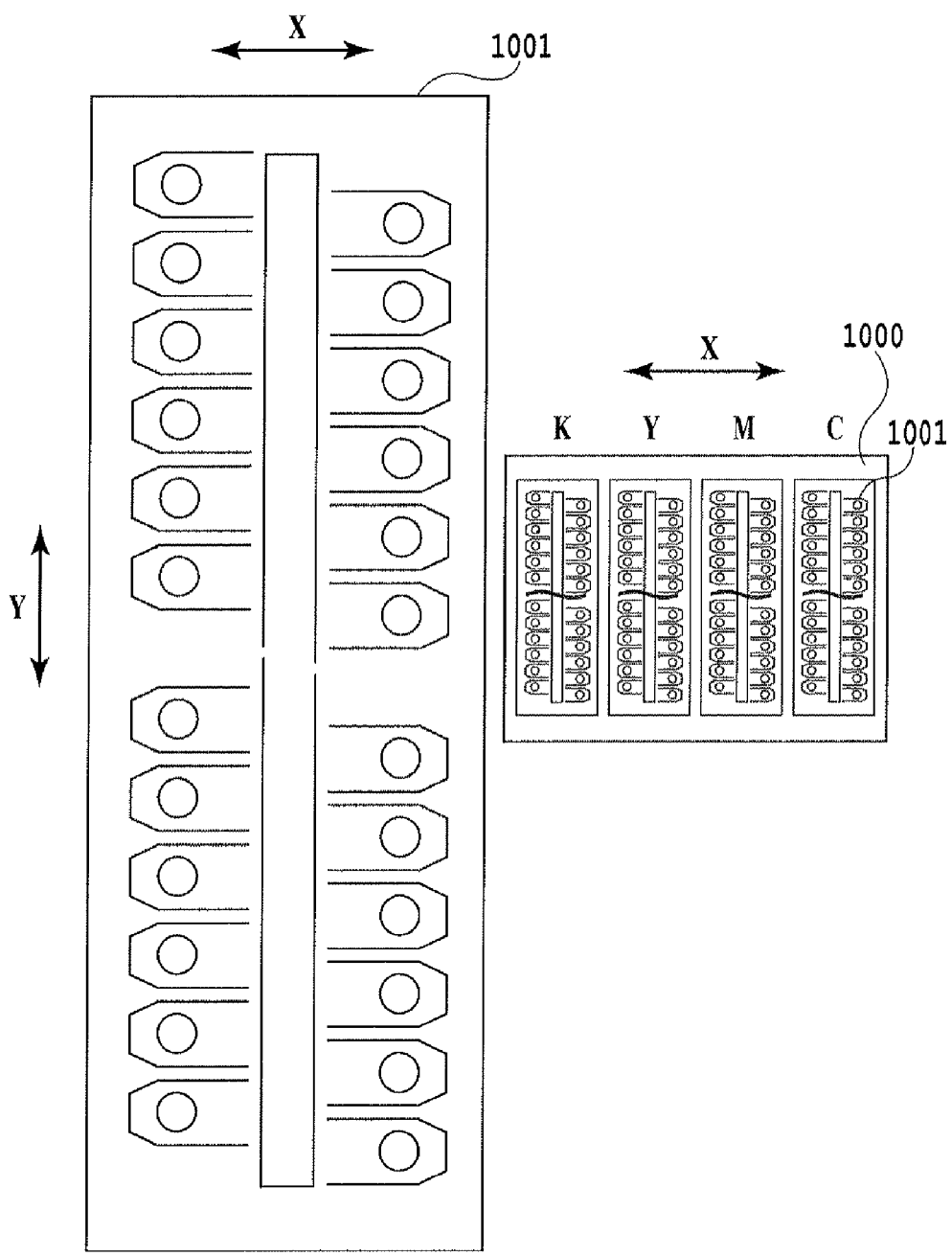
FIG. 4 is a schematic view illustrating a nozzle arrangement of the recording head used in the embodiment of the present invention.

FIG. 4 is a schematic view illustrating a state of a nozzle arrangement in the recording head 1000 used in this embodiment. The recording head 1000 of this embodiment is provided with four nozzle groups 1001 for ejecting four kinds (first to fourth) of inks, respectively, the nozzle groups being juxtaposed in the X direction the head moving direction). In this embodiment, the first ink is cyan (C), the second ink is magenta (M), the third ink is yellow (Y), and the fourth ink is black (K). Each color nozzle group 1001 has 256 nozzles arranged in a first direction. More particularly, each color nozzle group 1001 includes two nozzle arrays each having 128 nozzles arranged at 600 dpi pitch in the first direction (Y direction, here), and these two nozzle arrays are arranged in the first direction with half pitch offset. Thus, by the ink ejecting operation from these nozzles during movement the recording head 1000 in the X direction, the image can be recorded at the resolution of 1200 dpi (dot/inch). As described above, in this embodiment, a recording head comprising a plurality of nozzle groups each including a plurality of nozzles for ejecting the same color ink is used, but the present invention is not limited to such an example.

In this embodiment, for simplicity, the arranging direction (first direction) of the nozzles for ejecting same color ink is the same as the feeding direction the Y direction) of the recording material. However, the nozzle arranging direction (first direction) and the feeding direction (Y direction) are not necessarily the same. The advantageous effects of the present invention which will be described hereinafter are provided even if the nozzle arranging direction (first direction) is inclined more or less relative to the Y direction.

Figure 5:
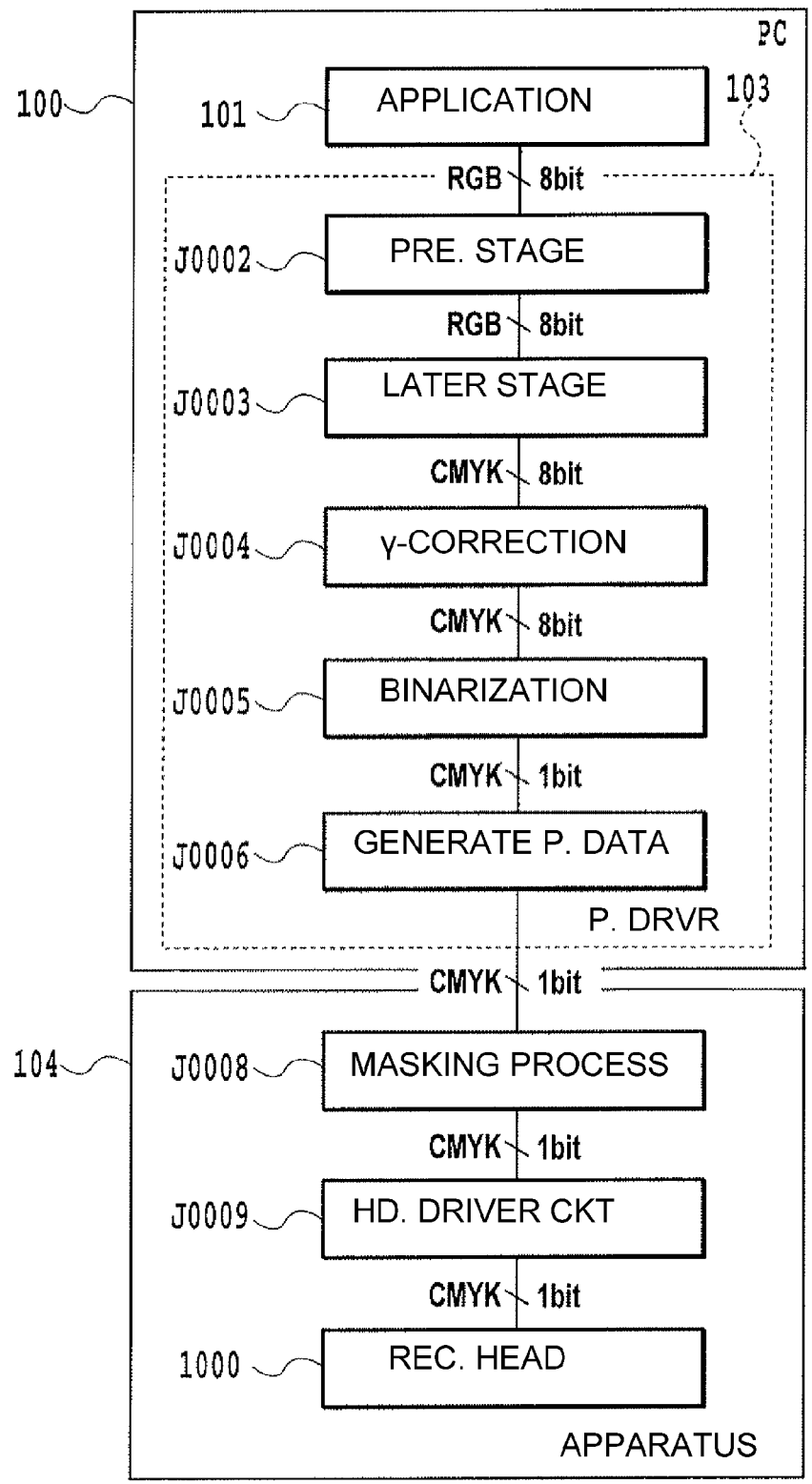
FIG. 5 is a block diagram illustrating a flow of image processing executed by a host apparatus and a recording apparatus in the recording system according to an embodiment of the present invention.

FIG. 5 is a block diagram illustrating a flow of image processing operations executed by the host apparatus 100 and the recording apparatus 104 in the recording system described in the foregoing.

By the host apparatus 100, the user produces image data to record by the recording apparatus 104 using the application 101. The image data produced by the application 101 upon the recording is transferred to the printer driver 103.

The printer driver 103 executes a preliminary process J0002, a later stage process J0003, a γ-correction J0004, a binarization process J0005, and a print data preparation process J0006.

Referring to FIG. 2, in the preliminary process J0002, the application 101 executes color gamut conversion by which a color gamut of the image displayed on the display 106 through the display driver 105 is converted to a color gamut of the recording apparatus 104. More particularly, 8 bit image data R, G, B are converted to 8 bit data R, G, B in the color gamut of the recording apparatus 104, referring to a three-dimensional LUT stored in the ROM 110.

In the later stage process J0003, a signal value conversion is carries out so that R, G, B after the conversion are expressed by four ink colors C, M, Y, K ejected by the recording head 1000 carried in the recording apparatus 104. More particularly, the 8 bit data R, G, B provided by the preliminary process J0002 are converted to 8 bit data C, M, Y, K by referring to the three-dimensional LUT stored in the ROM 110.

Subsequently, the γ correction J0004 executes γ correction of the CMYK data provided by the later stage process J0003. More particularly, a conversion is carries out so that the 8 bit data CMYK provided by color separation linearly correspond to a tone gradation property of the recording apparatus.

In the binarization process J0005, γ-corrected 8 bit data C, M, Y, K are converted to 1 bit data C, M, Y, K through a predetermined quantization process method. Each of the binarized image data has 1 bit information indicative of whether to record the dot for a pixel corresponding to a print resolution of the recording apparatus 104.

In the print data preparation process J0006, print data is produced by assigning control information relating to the recording operation, such as recording material information, recording quality information, sheet feeding method or the like to 1 bit color data generated by the binarization process J0005. The print data generated in this manner is supplied to the recording apparatus 104 from the host apparatus 100.

The recording apparatus 104 carries out a masking process J0008 using a mask pattern prepared for binary image data included in print data supplied thereto. Here, the mask pattern is a pattern which determines whether to permit recording or not for each of pixels constituting an area passed by the nozzle by one movement of the recording head, as described hereinbefore.

In the masking process J0008, the binary image data is divided into image data to record by each of the nozzle blocks corresponding to each scanning of the multi-path recording, using a predetermined mask pattern stored in a memory of the recording apparatus 104. More particularly, a logical multiplication calculation is carries out by the mask pattern (binary data) determining whether to record or not and the binary image data supplied from the host apparatus 100, for each pixel in the area passed by each nozzle through one scanning of the recording head. As a result, binary image data for actual recording in one recording scan of the recording head are generated. Thereafter, the generated binary image data are supplied to the head driving circuit J0009. Each nozzle of the recording head 1000 executes the recording operation at predetermined timing in accordance with the binary image data.

Figure 6:
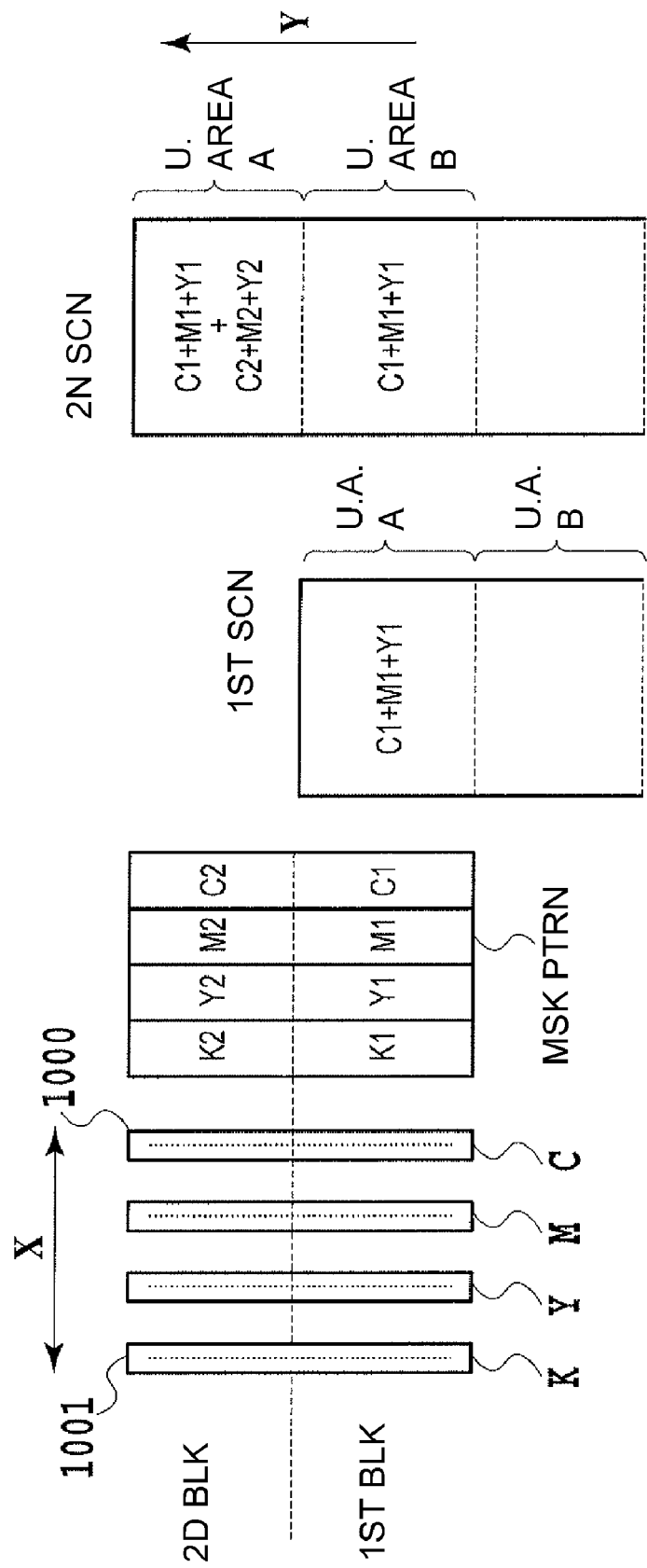
FIG. 6 is a schematic view schematically illustrating a structure of a multi-path recording.

FIG. 6 is a schematic view schematically illustrating a structure of a multi-path recording. The recording apparatus of the embodiment is a serial type ink jet recording apparatus, wherein the recording scan in which the ink is ejected on the basis of the binary image data while moving the recording head 1000 in the X direction, and the feeding operation in which the recording material is fed in the Y direction, are carried out alternately to form an image stepwisely. Here, the description will be made as to an example in which two-path recording is effected as the multi-path recording.

In the case of two-path recording, each color nozzle group of the recording head 1000 is divided into a first nozzle block having 128 nozzles and a second nozzle block having 128 nozzles in the nozzle arranging direction (Y direction in this example). In each recording scan, each nozzle block effects binary image data recording in accordance with the mask pattern corresponding to the nozzle block. A mask pattern portion corresponding to the first nozzle block is called first pattern portion and a mask pattern portion corresponding to the second nozzle block is called second pattern portion.

Referring to FIG. 6, the description will be made taking cyan. The first nozzle block of cyan is correlated with a mask pattern C1 as the first pattern portion, and the second nozzle block of cyan is correlated with a mask pattern C2 as the second pattern portion. In a first scanning, the recording is carried out by the first nozzle block of cyan in accordance with the mask pattern C1 in a unit area A of the recording material. The recording material is fed by the amount corresponding to a width of unit area A, and then in a second scanning, the recording is carried out by the second nozzle block of cyan in accordance with the mask pattern C2. By the two recording scans, the recording is effected by a sum of the mask patterns C1 and C2 in the unit area A with the cyan ink. The mask patterns C1 and C2 are in a complementary relation relative to each other, and all of the cyan binary data are recorded either by the first nozzle block or the second nozzle block in the two recording scans. The mask pattern is used as means for determining whether to permit recording of the image data corresponding to each pixel, in order to divide the binary image data into two nozzle blocks.

Figure 7:
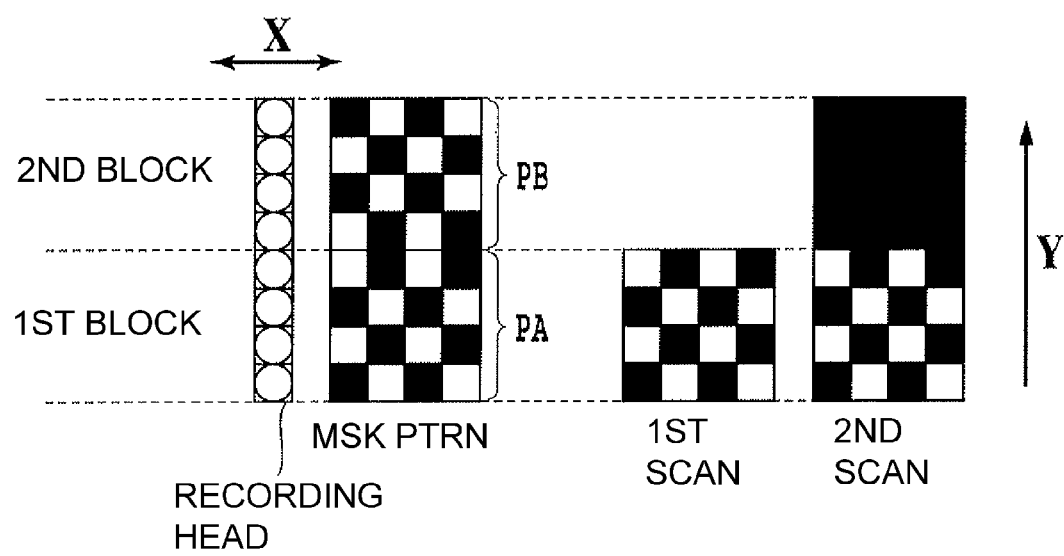
FIG. 7 is a schematic view illustrating a specific example of a mask pattern in two-path recording.

FIG. 7 is a schematic view illustrating a specific example of the mask pattern in the two-path recording. Here, for simplicity, the description will be made as to an example of a recording head having 8 nozzles including four nozzles in the first nozzle block and four nozzles in the second nozzle block. In this example, the mask pattern as the first pattern portion corresponding to the first nozzle block is PA, and the mask pattern as the second pattern portion corresponding to the second nozzle block is PB. Each mask pattern comprises an area of four pixels×four pixels, wherein the pixels indicated by black are pixels for which recording is permitted (recording permission pixel), and the pixels indicated by white are pixels for which recording is not permitted (non-recording-permission pixel). More particularly, the mask pattern comprises binary data including 1 indicative of the recording permission pixel and 0 indicative of the non-recording-permission pixel, which are subjected to logical multiplication process (masking process) with the binary image data Mask pattern 1 does not mask the binary image data 1 to permit recording based on 1 of the binary image data. On the other hand, the mask pattern 0 masks the binary image data 1 to prevent recording based on the binary image data 1. The mask patterns PA and PB are in complementary relation with each other, and the recording for all pixels in the unit area of the recording material by the first scanning with the first nozzle block and the second scanning with the second nozzle block.

Figure 11:
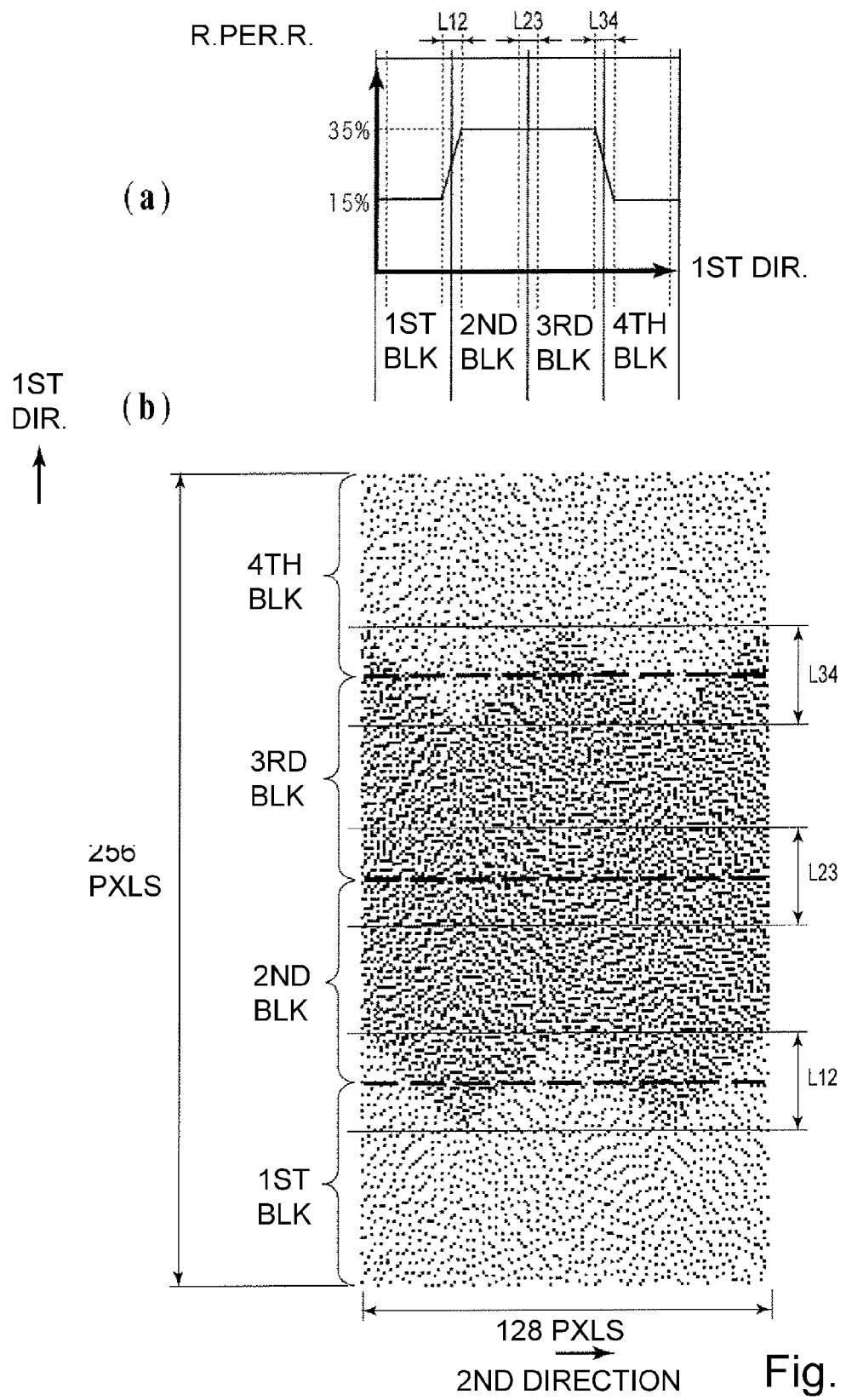
In FIG. 11, parts (a) and (b) illustrate a distribution of the recording permission ratios and a dispersion state of recording permission pixels in the mask pattern which is made according to the first embodiment so that the inter-band unevenness, the connection stripes and the in-band unevenness do not appear.

Here, for simplicity, the description has been made as to an example in which the recording permission pixels and the non-recording-permission pixels are arranged in a staggered fashion in an area of 4 pixels×4 pixels. However, the size of the mask pattern employed in the actual multi-path recording is larger than that of the mask shown in FIG. 7, as shown in FIG. 11 or the like. The arrangement of the recording permission pixels and the non-recording-permission pixels of the mask pattern is more complicated than that of the mask shown in FIG. 7.

In addition, in the foregoing, a two-path recording as an example of the multi-path recording has been described, but the present invention is applicable to a larger number multi-path recording, such as four-path recording. In other words, the multi-path recording is implementable if, for multi-path number of N, the nozzle group is divided into N blocks, and the mask patterns complementary with each other are assigned to the respective blocks, wherein the recording material is fed between the recording scans by the amount corresponding to the width of the block.

In the following, embodiments employing the ink jet recording system and the multi-path recording method described in the foregoing will be described with features of specific mask patterns.

Embodiment 1

The embodiment employs a mask pattern four-path recording. FIGS. 8-11 shows a distribution of recording permission ratios the dispersion state of recording permission pixels with respect to each of the conventional mask pattern and the mask pattern of this embodiment, for the purpose of comparing the conventional mask pattern and the mask pattern of this embodiment.

In the case of four-path recording, the nozzle group is divided into four nozzle blocks (first-fourth nozzle blocks) in the first direction, and between sets each including four scanning operations, the recording material is fed by the distance corresponding to the width of one block. Here, four nozzle blocks are first to fourth blocks. In this embodiment, each nozzle group comprises 256 nozzles, and therefore, each block comprises 64 nozzles.

A unit area, having a width corresponding to 64 nozzles, of the unit area on the recording material is subjected to a first recording scan by a first nozzle block, then a second scanning by a second nozzle block, then a third scanning by a nozzle block, and then a fourth scanning by a fourth nozzle block, by which an image is completed. In the following, mask pattern portions for masking the image data corresponding to the nozzles of the first, second, third and fourth nozzle blocks, respectively are called first, second, third and fourth pattern portions, respectively.

A definition and an interpretation of the recording permission ratio in this Specification will be described. The recording permission ratio is a ratio of the pixels for which recording is permitted in one recording scan (movement) of the recording head to the pixels constituting a predetermined area. The recording permission ratio of the nozzle is a ratio of the pixels for which the recording of the nozzle is permitted to the pixels which the nozzle passes in one movement (scanning) of the recording head. The recording permission ratio of the nozzle block is a ratio of the pixels for which the recording of the nozzle block is permitted to the pixels which the nozzle block passes in one movement (scanning) of the recording head. Here, the arrangement of the pixels for which the recording is permitted in one scanning of the recording head is determined by a mask pattern prepared beforehand. Therefore, the recording permission ratio of the nozzle, the recording permission ratio of the nozzle block, the recording permission ratio are determined on the basis of the mask pattern. The recording permission ratio determined on the basis of the mask pattern is a ratio of the recording permission pixels to the recorded pixels and the non-recording-permission-pixels constituting the mask pattern.

In a step of preparing a mask pattern of the present invention, the determination is made as to whether the respective pixels are to be recording permission pixels or non-recording-permission pixels on the basis of a design target recording permission ratio. As a result of use of the mask pattern prepared in this manner, the design target recording permission ratio is provided in the predetermined area constituted by the plurality of pixels.

Figure 1:
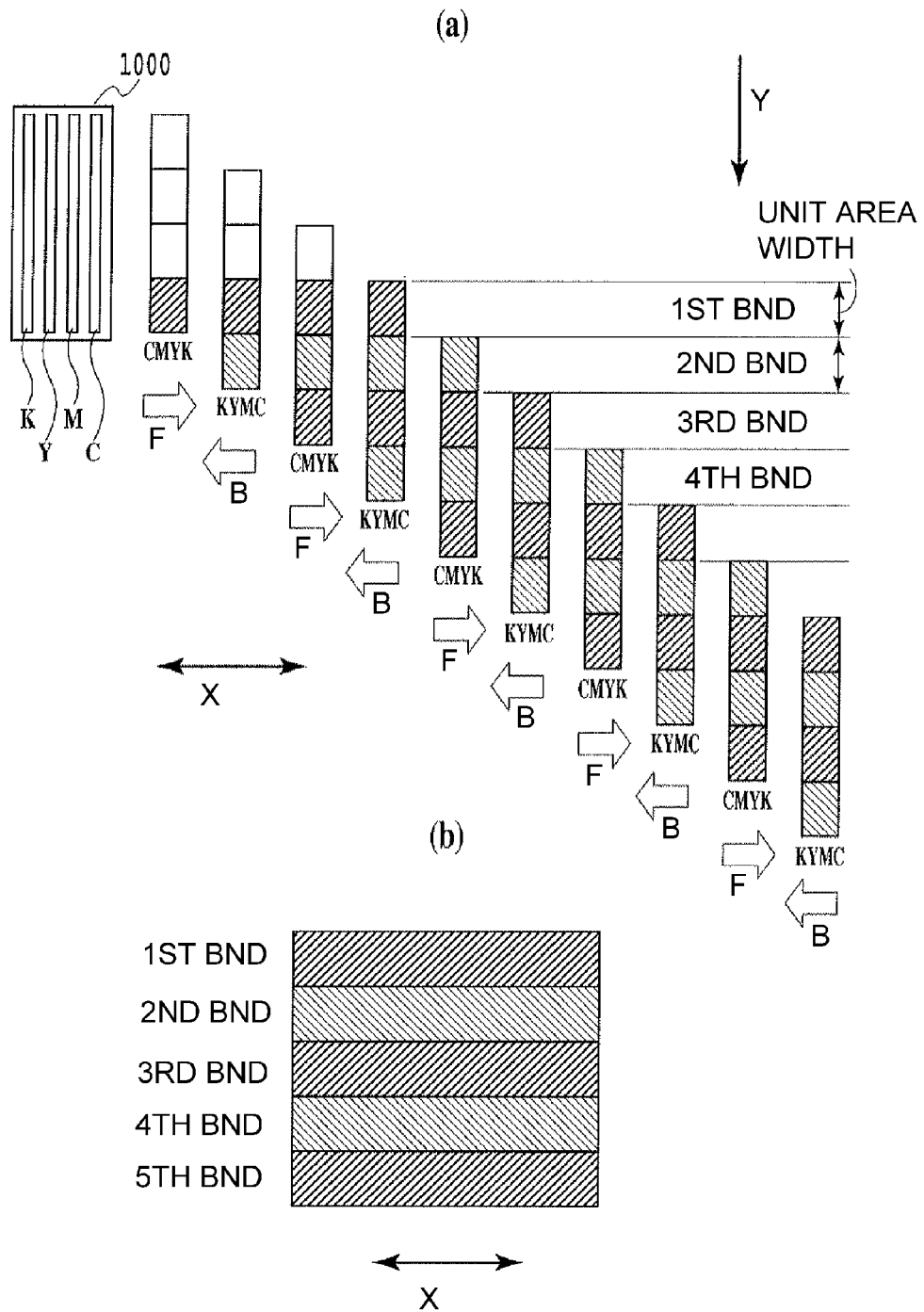
In FIG. 1, part (a) and part (b) are schematic views specifically illustrating a cause and a phenomenon of in-band unevenness.
Figure 8:
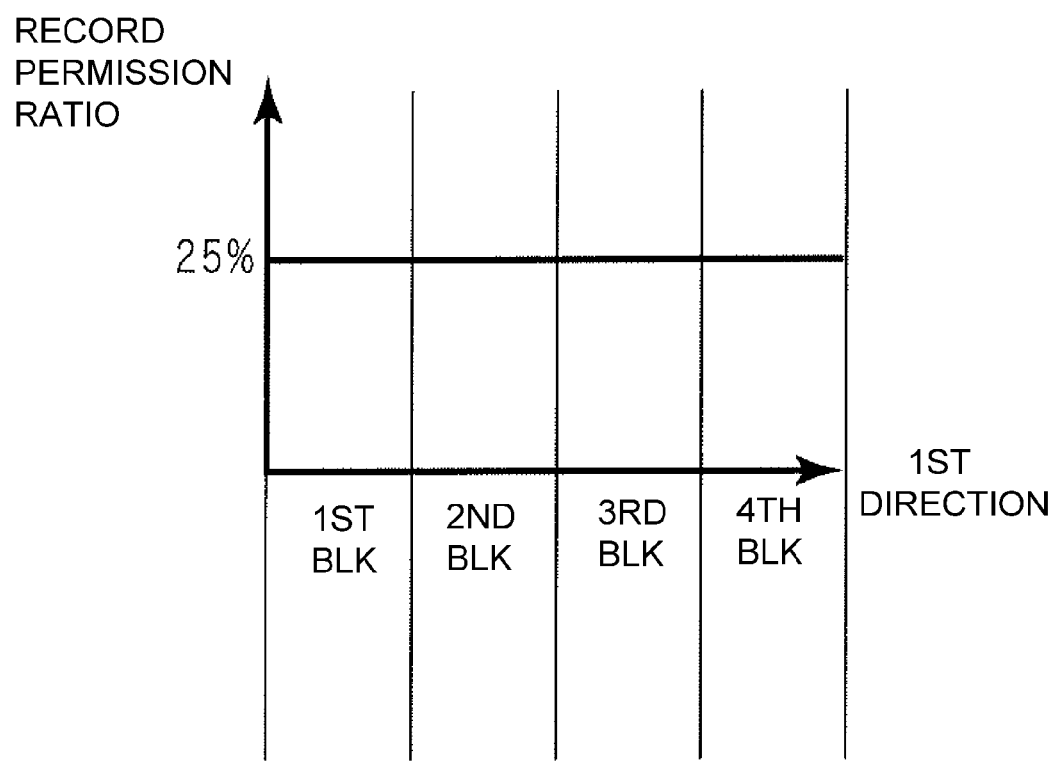
FIG. 8 illustrates an example of a mask pattern (flat mask) having a recording ratio of 25% in any of nozzle blocks.

FIG. 8 shows a distribution of the recording permission ratios of the mask pattern wherein the recording permission ratios of the nozzles are 25% also in any block. In the Figure, an abscissa indicates an arrangement position of the nozzle with respect to the nozzle arranging direction the first direction), and an ordinate indicates the recording permission ratios of the respective nozzles. In the case of the mask pattern shown in FIG. 8, the unit area (same image area) of the recording material is recorded by the first block to the fourth block up to 100%=25%+25%+25%+25%. In the present Specification, the constant mask pattern in which the recording permission ratios are the same for all the nozzles is called flat mask. When a bi-directional multi-path recording is carries out using such a flat mask, unit areas with which the application order of the color inks and/or the application timing are different appear alternately as has been described in the foregoing in conjunction with FIG. 1, and therefore, the inter-band unevenness is produced.

Figure 9:
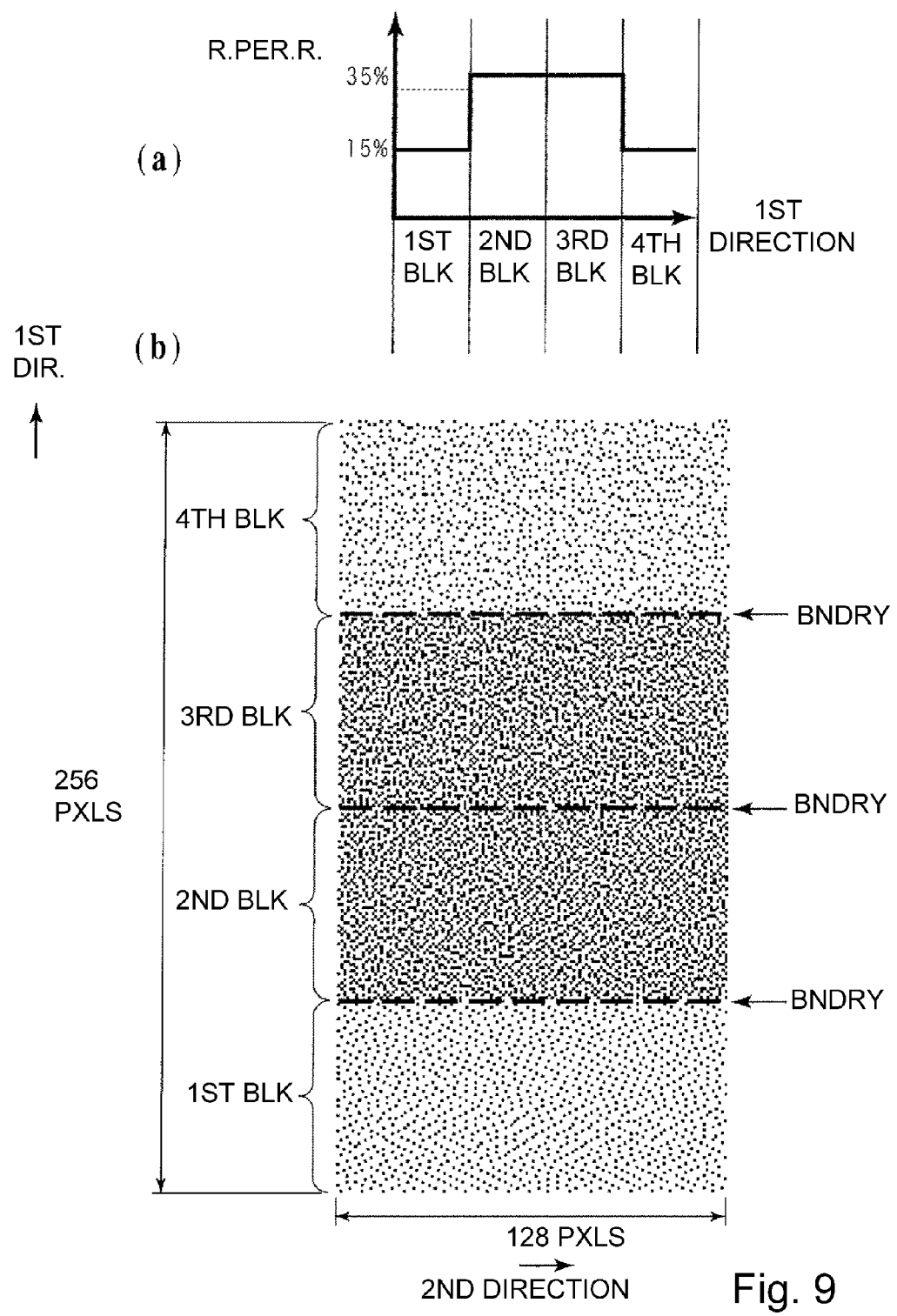
In FIG. 9, parts (a) and (b) illustrate an example of a distribution of the recording permission ratios and a dispersion state of recording permission pixels in the mask pattern which is adjusted in the recording permission ratios so that the inter-band unevenness does not appear.

Parts (a) and (b) of FIG. 9 show a distribution of the recording permission ratios of the mask pattern adjusted for each block for nozzle blocks so as to suppress the inter-band unevenness and a dispersion state of the recording permission pixels. In the mask pattern of FIG. 9, the recording permission ratios of the first pattern portion corresponding to the first block and the fourth pattern portion corresponding to the fourth block are 15%, and the recording permission ratios of the second pattern portion corresponding to the second block and the third pattern portion corresponding to the third block are 35%. As shown in part (b) of FIG. 9, the mask pattern comprising first-fourth pattern portions includes 128 pixels in a main scan direction (second direction) and 256 pixels in a sub-scan direction (first direction) which are either a recording permission pixels (black) or a non-recording-permission pixel (white). Particularly, in the mask pattern, a ratio of the recording permission pixels in each pixel row extending in the second direction is constant such that the recording permission ratio of the nozzle in a block is constant the (flat). When such a mask pattern is used, the unit area of the recording material is recorded by the first—fourth blocks up to 15%+ 35%+35%+15%=100%.

In this Specification, a mask pattern in which the recording permission ratio in each block is substantially constant, but the recording permission ratios are adjusted for respective blocks and therefore are different from block to block, is called stepwise mask. When, however, the recording is effected using the stepwise mask shown in parts (a) and (b) of FIG. 9, portions (boundary portion) where the recording permission ratios of the adjacent blocks are significantly different from each other appear extending linearly in the second direction (main scan direction the) as has been described in the foregoing. As a result, connection stripes appear at the boundary portions. When the difference between the recording permission ratios of the adjacent blocks is large, the connection strips tend to occur.

Figure 10:
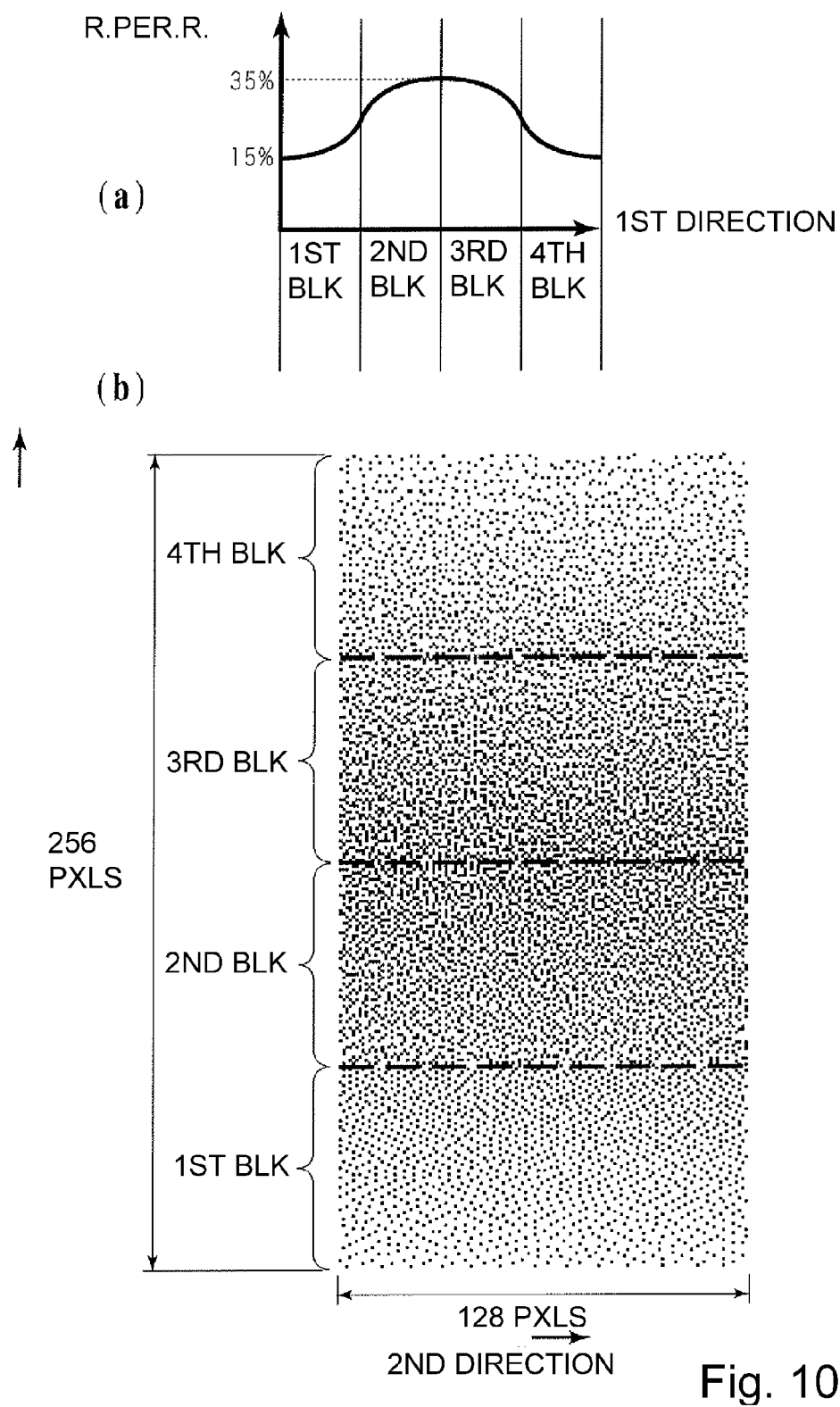
FIG. 10 illustrates an example of a distribution of the recording permission ratios and a dispersion state of recording permission pixels in the mask pattern which is adjusted in the recording permission ratios so that the inter-band unevenness and connection stripes do not appear.

Parts (a) and (b) of FIG. 10 show an example of the distribution of the recording permission ratios of the mask pattern which are adjusted for respective nozzles so as to suppress both of the inter-band unevenness and the connection strip, and a dispersion state of the recording permission pixels. With such a mask pattern, the recording permission ratios are adjusted for nozzle blocks, respectively, and the recording permission ratios are adjusted for nozzles, respectively so as to prevent extreme difference in the recording permission ratio adjacent to the boundary between the adjacent nozzle blocks and in all the nozzle areas in the block. As shown in part (b) of FIG. 10, the recording permission pixels of the mask pattern have high dispersion property over the entire area, and in addition, the ratio of the recording permission pixel (recording permission ratio) in each pixel row changes smoothly along the first direction.

In this Specification, the mask pattern in which the recording permission ratio of the nozzle gradually changes within the nozzle block and also between nozzle blocks as shown in parts (a) and (b) of FIG. 10, is called gradation mask. With use of the gradation mask, the recording permission ratio change between the nozzle blocks is properly adjusted, and in addition, the change of the recording permission ratio adjacent to the boundary between adjacent nozzle blocks can be made gradual, and therefore, both of the inter-band unevenness and the connection strip can be suppressed. As has been described in the foregoing, when the recording permission ratio is changed within the nozzle block, an in-band unevenness occurring within the band corresponding to the width of the nozzle block may result, in some cases.

Parts (a) and (b) of FIG. 11 show a distribution of the recording permission ratios of a mask pattern of this embodiment prepared so as to suppress all of the inter-band unevenness, the connection strip and the in-band unevenness, and the dispersion state of the recording permission pixel. The mask pattern of this embodiment is prepared so as to satisfy all of a first condition for suppressing the inter-band unevenness, a second condition for suppressing the connection strip and a third condition for suppressing the in-band unevenness.

Here, by the first condition, recording permission ratios of the nozzle blocks are adjusted for each block. As a result of the adjustment, average recording permission ratios of at least two adjacent pattern portions corresponding to at least two adjacent blocks are different from each other. In the example of FIG. 11, an average recording permission ratio of the first pattern portion corresponding to the first block is approx. 15%, and an average recording permission ratio of the second pattern portion corresponding to the second block is approx. 35%.

The second condition is that in a boundary area including the boundary between the pattern portions corresponding to the adjacent nozzle blocks, (A) the recording permission ratio in each pixel row extending in the second direction (main scan direction) is within the range between the recording permission ratio of the non-boundary area of one of the pattern portions and the recording permission ratio of the non-boundary area of the other pattern portion, and (B) the recording permission ratio in a pixel line extending in the first direction (sub-scan direction) changes in accordance with the position with respect to the second direction the main scan direction). By satisfying the second condition, within the pixel line in the boundary area, the position, with respect to the sub-scan direction, the position where the recording permission ratio changes does not continue linearly in the main scan direction.

The third condition is that in each pattern portion corresponding to the nozzle block, the recording permission ratio is substantially constant in each pixel row of the non-boundary area which is other than the boundary area. Here, substantially constant rather than constant is used because in the mask pattern of this embodiment, it is not necessary that the recording permission ratios of each of the pixel row are strictly constant. As described in the foregoing, the recording permission ratio of each pixel row is determined depending on the number of the recording permission pixels of the pixels (constant) included in the pixel row. Therefore, for the pixel row group in which the same recording permission ratio are to be set, the number of the recording permission pixels included in the pixel row group are set to be the same. However, there is a case in which the number of the recording permission pixels included in the pixel row group cannot be set to be the same, for the following reason. For example, consider that the recording permission ratios of 10 pixel rows corresponding to 10 nozzles. If the size of the mask pattern in the scanning direction is 100 pixels, the number of the recording permission pixel corresponding to each of 10 pixel rows is set to be 15, and then the recording permission ratio of each pixel row is 15%. On the other hand, if the size of the mask pattern in the scanning direction is 128 pixels, the number of the recording permission pixel corresponding to each of 10 pixel rows has to be set to be 19.2. The digits to the right of the decimal point are not selectable, and therefore, 19 recording permission pixels are set for 8 pixel rows out of 10 pixel rows, and 20 recording permission pixels are set for remaining 2 pixel rows. For this reason, even in the case that the same recording permission ratio is to be set, the numbers of the recording permission pixels for respective pixel rows may be more or less uneven, depending on the size of the mask pattern. Therefore, also in this embodiment, the recording permission ratios of pixel rows constituting the non-boundary area are not always 15% or 35% strictly, and they involve more or less variations, as the case may be. Thus, substantially constant includes constant covering the above-described variations in the recording permission ratio, but the variation is not large enough to observe the in-band unevenness.

Referring to parts (a) and (b) of FIG. 11, at the boundaries between adjacent mask patterns of the first-fourth pattern portions, boundary areas L12, L23 and L34 each comprising 32 pixels (16 pixels from each of adjacent ones) are provided. In the non-boundary areas of the first pattern portion corresponding to the first block and the fourth pattern portion corresponding to the fourth block, the number and distribution of the recording permission pixels are determined so that a ratio of the recording permission pixels in each pixel row extending in the second direction is substantially 15% (first value). In addition, in the non-boundary area of the second pattern portion corresponding to the second block and the third pattern portion corresponding to the third block, the number and distribution of the recording permission pixels are determined so that a ratio of the recording permission pixels in each pixel row is second substantially 35% (value). In this manner, said mask pattern of FIG. 11 satisfies the above-described first and third conditions.

On the other hand, in the boundary areas L12 and L34, the ratio of the recording permission pixels in the pixel row is between the above-described first value (15%) and second value (35%), and the ratio of the recording permission pixels in the pixel line extending in the first direction is different depending on the position in the second direction. Particularly, in each pixel line, the recording permission ratio changes drastically at one of 32 pixels along the first direction (here, from 15% to 35%). The portion where the recording permission ratio drastically changes is called boundary portion.

For example, in the boundary area L12, the 32 pixels width area includes the boundary portion where the recording permission ratio of 15% (first recording permission ratio) of the non-boundary area of the first pattern portion and the recording permission ratio of 35% (second recording permission ratio) of the non-boundary area of the second pattern portion change. However, the position of the boundary portion with respect to the first direction changes in accordance with the position in the second direction. In the example of part (b) of FIG. 11, the position of the boundary portion in the first direction changes in accordance with the position in the second direction in a triangular shape. Since the boundary portion changes in the first direction, the recording permission pixels do not disperse in the boundary area L12, as contrasted to the non-boundary area of the first block or the second block.

Figure 12:
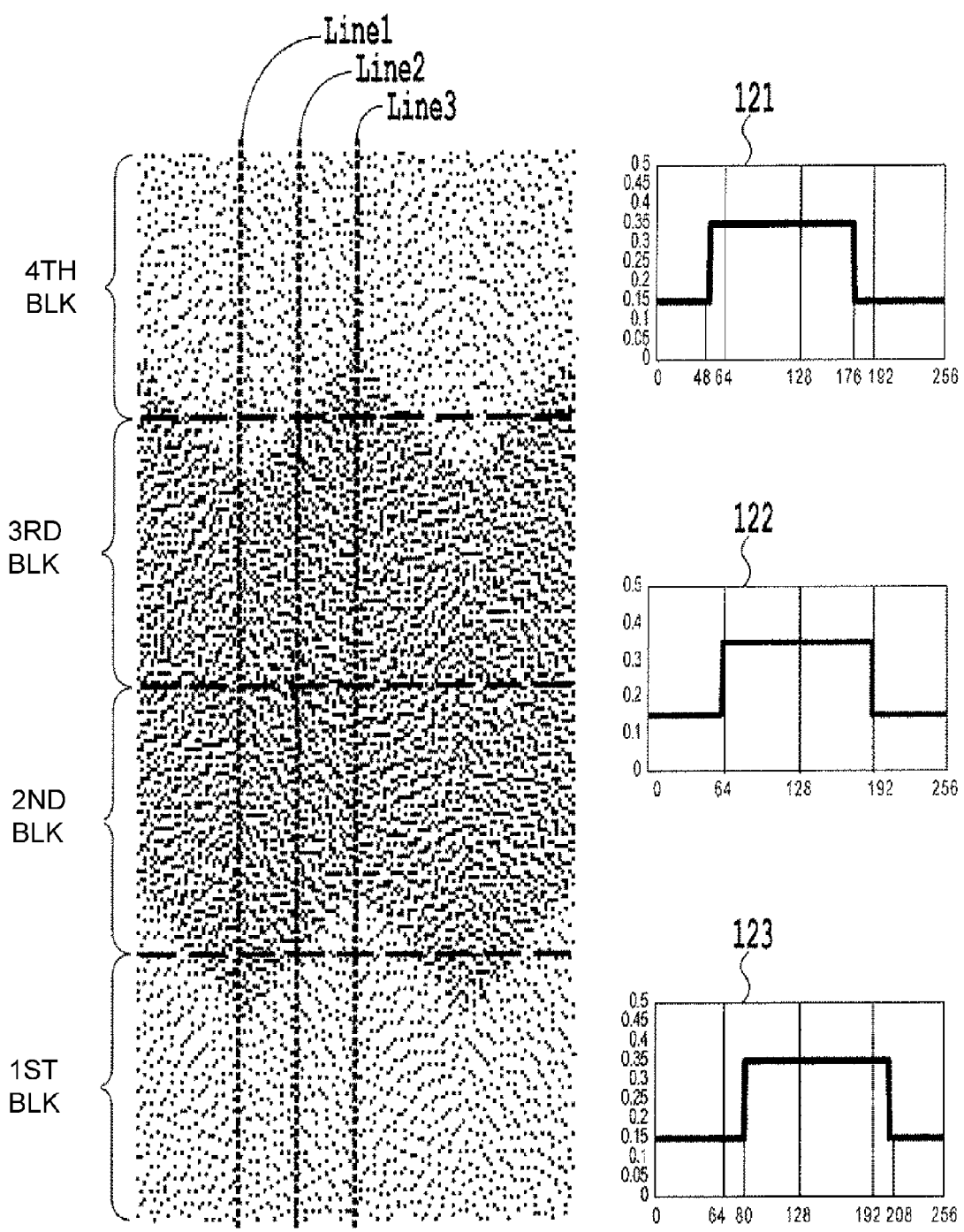
FIG. 12 illustrates a state in which a distribution of the recording permission ratios in a first direction of the mask pattern shown in FIG. 11 is different depending on a pixel position with respect to a second direction.

FIG. 12 illustrates the state in which the distribution of the recording permission ratio (distribution of recording permission pixel) in the first direction is different depending on the pixel position in the second direction, in the mask pattern shown in part (b) of FIG. 11. Designated by reference numerals 121-123 show distributions of the recording permission ratios in and Line3 Line1, Line2 which are pixel lines extending in the first direction. In 121-123, the abscissa represents pixel positions with respect to the first direction (sub-scan direction), and the point of origin (0) corresponds to the upstreammost (bottom in the Figure) pixel in the sub-scan direction. The ordinate represents the recording permission ratios of a neighborhood area in each pixel position (a predetermined area constituted by a plurality of pixels including the pixel position). In Line1, the recording permission ratio changes from 15% to 35% at the position of 48th pixel, and changes from 35% to 15% at the position of 176th pixel. In Line2, the recording permission ratio changes from 15% to 35% at the position of the 64th pixel, and changes from 35% to 14% at the position of 192th pixel. In Line3, the recording permission ratio changes from 15% to 35% at the position of 80th pixel, and changes from 35% to 14% at the position of 208th pixel. As will be understood, according to this embodiment, the position of the boundary portion where the recording permission ratio changes between 15% and 35% is made different depending on the position in the main scan direction (second direction). In addition, as will be understood from the Figures, the position of the boundary portion in the sub-scan direction periodically and continuously changes within the range of the boundary area.

Figure 13:
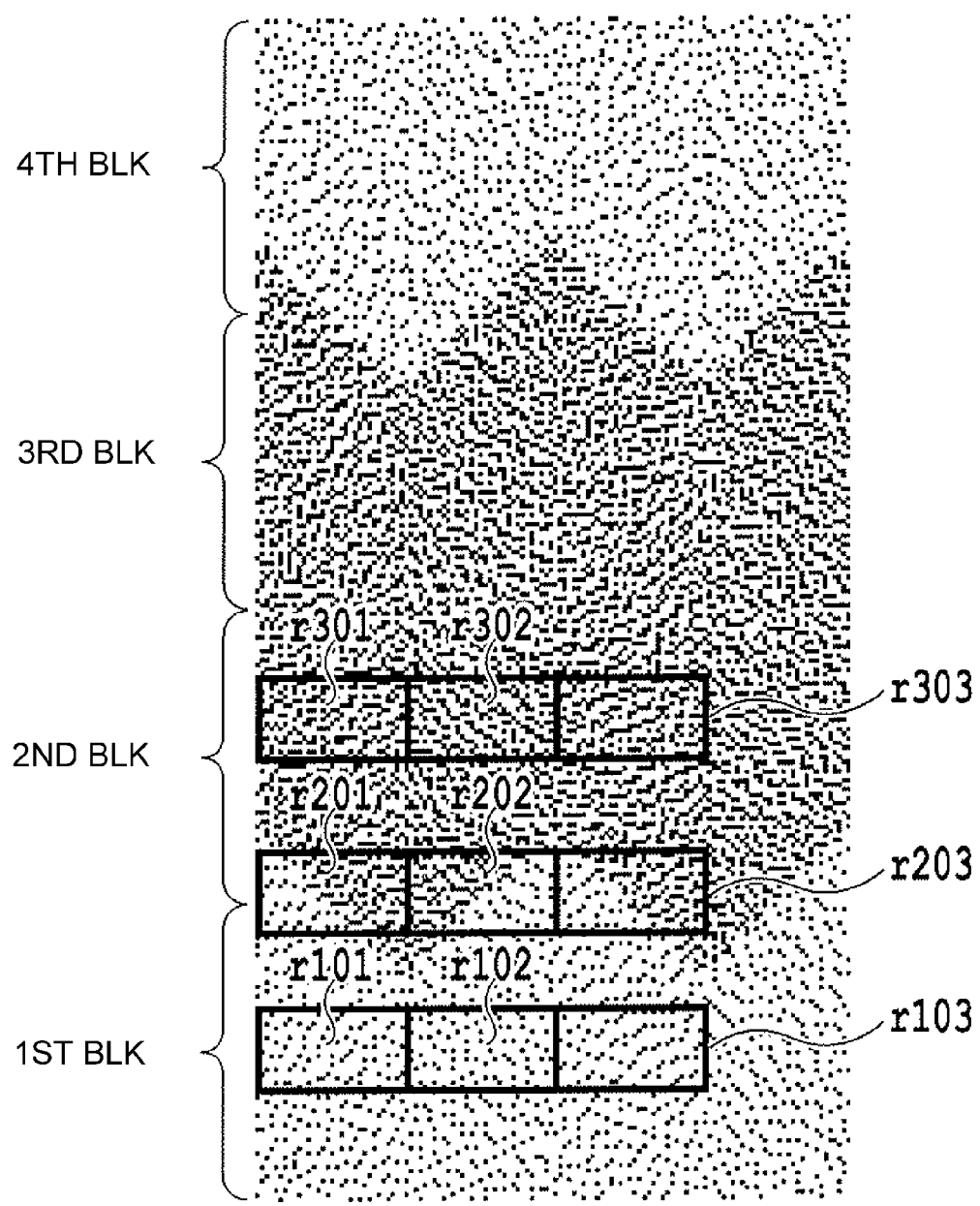
FIG. 13 illustrates a dispersion state of the recording permission pixels between a non-boundary area and a boundary area of the mask pattern shown FIG. 11.

FIG. 13 illustrates a comparison of the dispersion states of the recording permission pixels in the non-boundary area and boundary area of the mask pattern of FIG. 11. In the Figure, r101, r102 and r103 depict three areas having the same configurations and sizes which are arranged in the second direction (main scan direction) in the non-boundary area of the first pattern portion corresponding to the first block. The ratio of the recording permission pixels (black pixels) to the total pixels within the area is uniformly approx. 15% (first value). In addition, the ratio of the recording permission pixels in each pixel row of the first pattern portion is also approx. 15%. On the other hand, r301, r302 and r303 depict three areas having the same configurations and sizes which are arranged in the second direction (main scan direction) in the non-boundary area of the second pattern portion corresponding to the second block. The ratio of the recording permission pixels (black pixels) to the total pixels within the area is uniformly approx. 35% (first value). The ratio of the recording permission pixels in each pixel row of the second pattern portion is approx. 35%.

On the other hand, r201, r202 and r203 depict three areas having the same configurations and the same sizes which are arranged in the second direction (main scan direction) in the boundary area L12. In the areas, as will be observed, the recording permission pixels are divided into coarse portions and dense portions, as contrasted to the non-boundary area where the recording permission pixels are uniform. In addition, the position of the boundary portion changes depending on the position in main scan direction the second direction), and therefore, the recording permission ratios in the areas r201, r202 and r203. More particularly, in each of areas r201, r202 and r203, (A) the ratio of the recording permission pixels in each pixel row is within a range between the ratios of the two recording permission pixels corresponding to the respective non-boundary areas of the first and second pattern portions (15%-35%), and (B) the ratio of the recording permission pixels in each pixel line changes depending on the position in the second direction (main scan direction).

Thus, this embodiment satisfies the above-described second condition, and therefore, the position of the boundary portion, with respect to the sub-scan direction, where the recording permission ratio changes drastically is not continuous in the main scan direction. By this, the connecting stripe which may be caused by the position of the boundary portion in the sub-scan direction being continuous in the main scan direction can be reduced. In addition, according to the mask pattern of this embodiment described with parts (a) and (b) of FIG. 11, the first condition that the recording permission ratios of the nozzle blocks are adjusted for each block is satisfied. Also, the third condition that within each nozzle block, the recording permission ratio of the non-boundary area is substantially constant is satisfied. From the foregoing, according to this embodiment, a uniform image substantially free of the inter-band unevenness, the in-band unevenness and the connecting stripe.

FIG. 18 shows a result of comparison in the image quality after four path recording is carried out with the mask patterns of FIGS. 8-11 using the ink jet recording system described with FIGS. 2-5, for the purpose of confirming the effects of this embodiment. As will be understood from the Figure, use of conventional masks, irrespective of whether it is a flat mask, a gradation mask or a stepwise mask, cannot simultaneously reduce all of the inter-band unevenness, the in-band unevenness and connecting stripe. On the contrary, it is confirmed that the use of the mask pattern of this embodiment can simultaneously suppress all of them, and therefore, satisfactory images can be produced.

Figure 14:
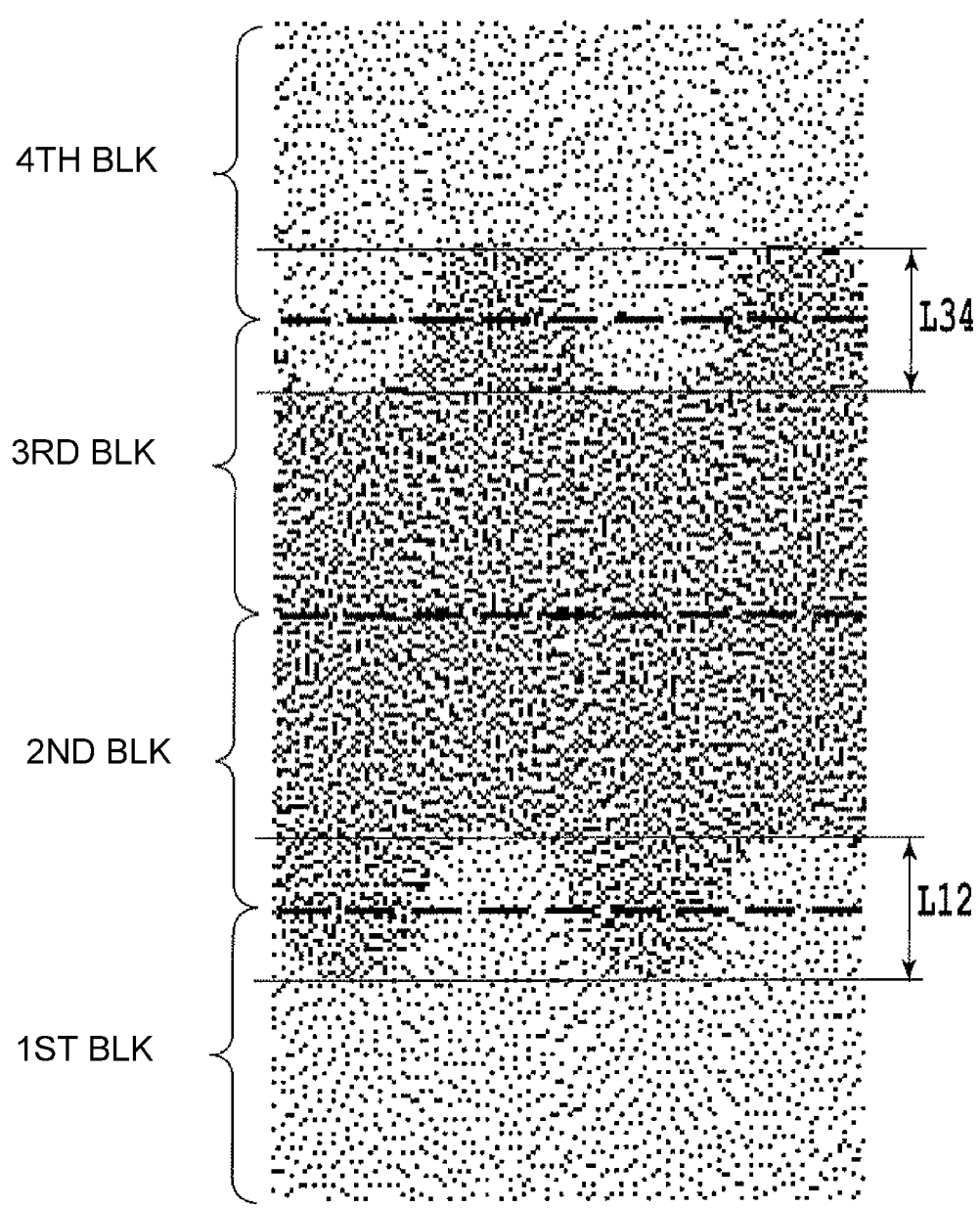
FIG. 14 illustrates an example of the mask pattern with which a position of the boundary portion changes along an arcuation.
Figure 15:
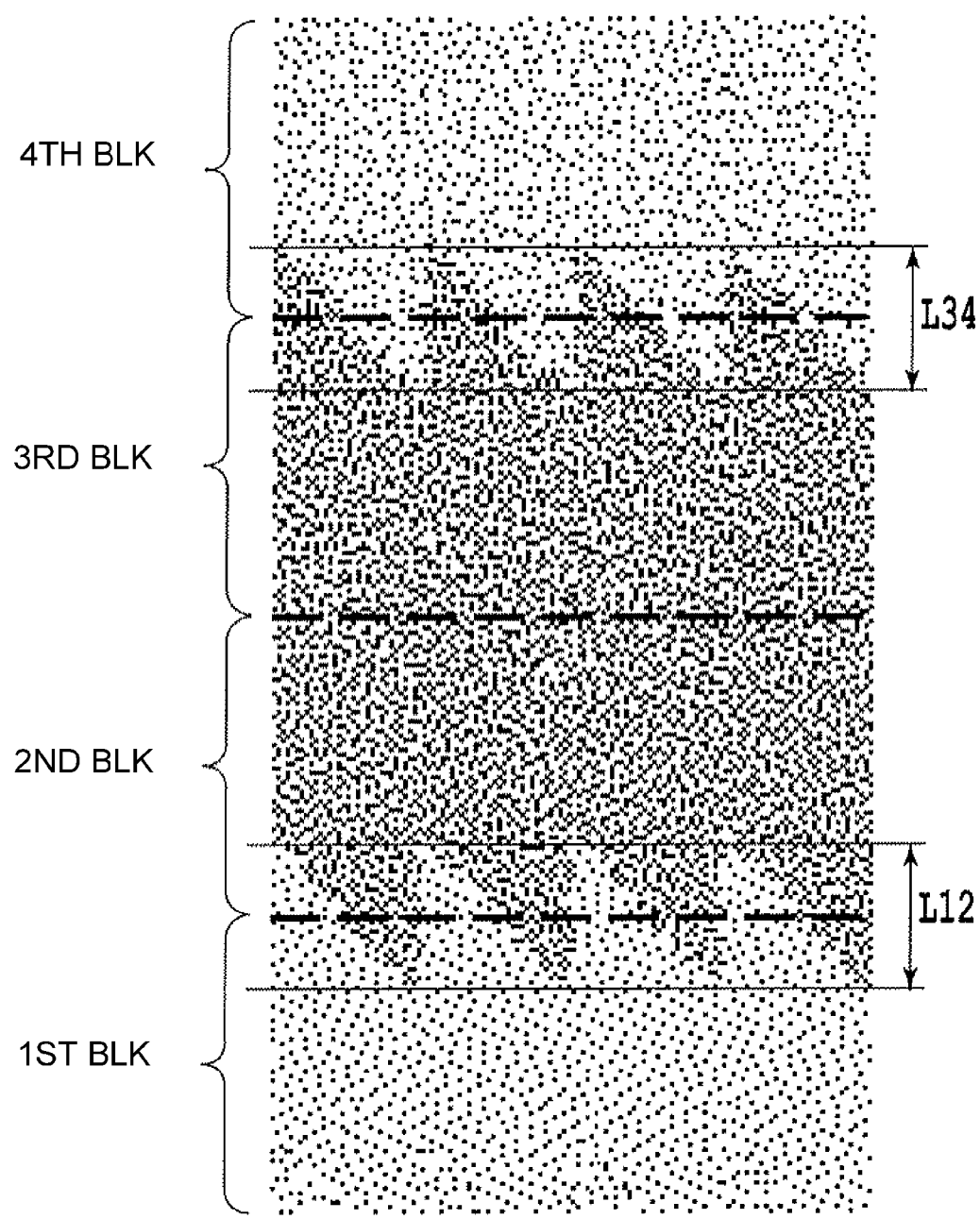
FIG. 15 illustrates an example of a mask pattern having sawtooth shape at the boundary portion.
Figure 16:
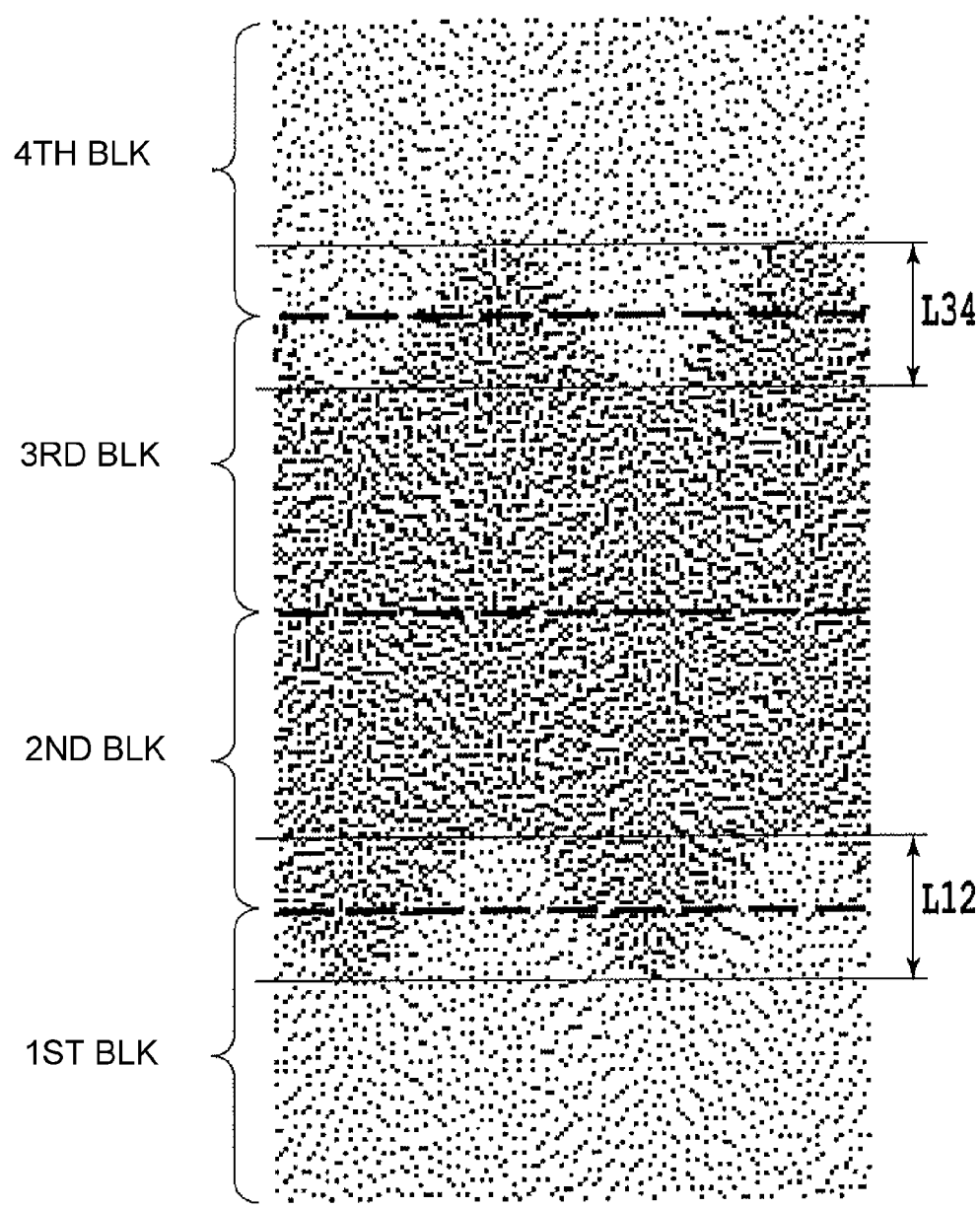
FIG. 16 illustrates an example of a mask pattern having a sinusoidal wave shape at the position of the boundary portion.

In the foregoing, an example in which the position of the boundary portion changes in a triangular shape within the boundary area has been taken, but various shapes of change of the boundary portion may be modified. For example, FIG. 14 shows an example of the mask pattern in which the position of the boundary portion changes in arcuation shapes, and FIG. 15 shows an example of the mask pattern in which the position of the boundary portion changes in sawtooth shape. FIG. 16 shows an example of the mask pattern in which the position of the boundary portion changes in a sinusoidal wave shape. Any of these shapes satisfies the condition that the position of the boundary portion with respect to the first direction changes periodically and continuously within the boundary area.

Figure 17:
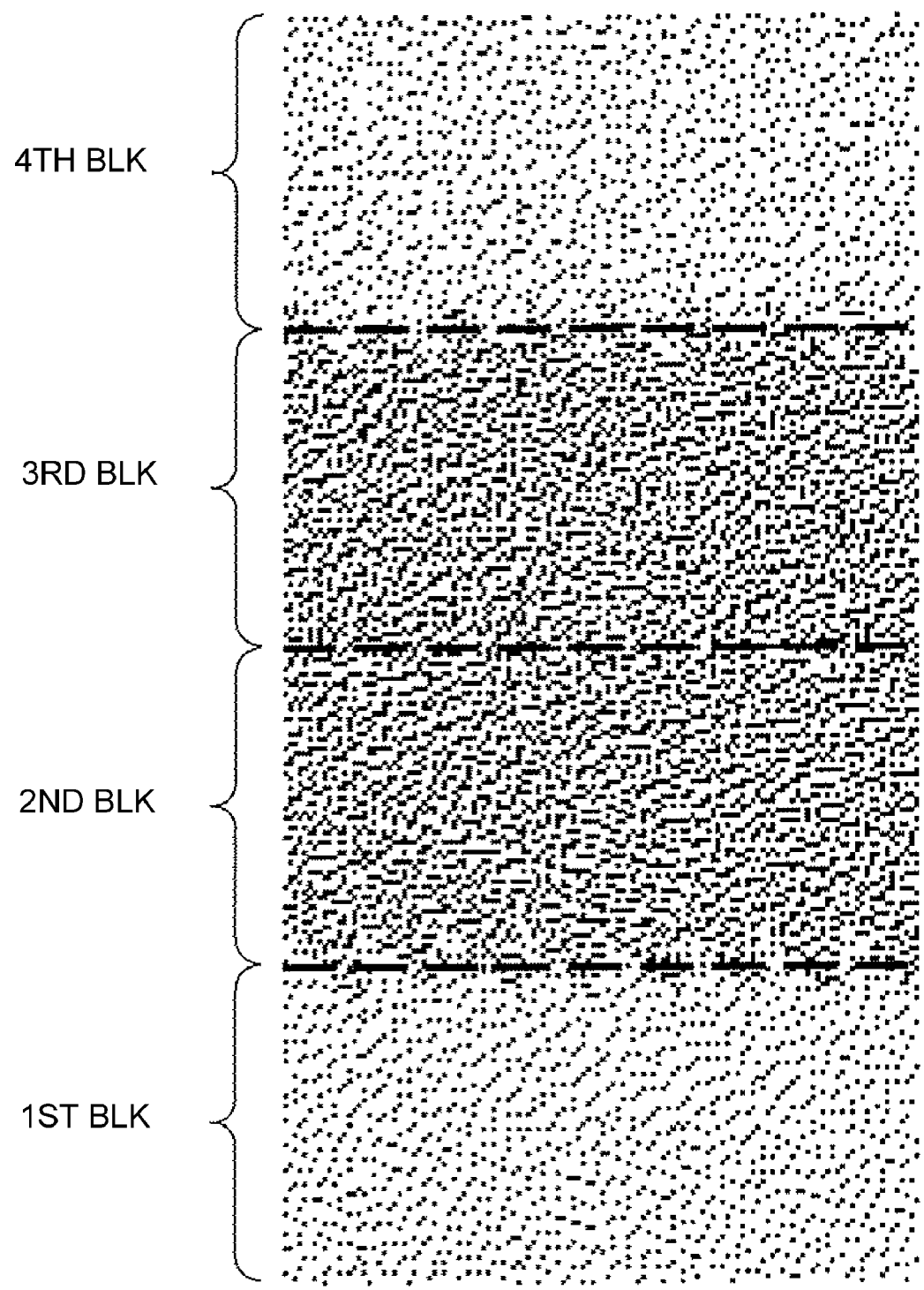
FIG. 17 illustrates an example in which amplitude (width of boundary area) and a cyclic period of the boundary portion shape are smaller than those of the mask pattern of FIG. 15.

FIG. 17 shows an example in which the position of the boundary portion changes in the form of sawtooth similarly to FIG. 15, and the amplitude (width of boundary area) and the cyclic period are smaller than those of the mask pattern of FIG. 15. In the foregoing examples, the amplitude (width of boundary area) has been described as being 32 pixels, but the amplitude or changing cyclic period are not limiting to the present invention. The conspicuousness of the connecting stripe may be different depending on a print resolution, an ink ejection amount and/or a kind of the recording material, and therefore, the mask patterns adjusted in the amplitude and/or the cyclic period may be prepared.

Furthermore, the boundary area of the embodiment is constituted by such arrangements of the recording permission pixels and the non-recording-permission pixels that the recording permission ratio the 15%, for example) of one side non-recording area and the recording permission ratio (35%, for example) of the other side non-recording area, with respect to the boundary portion.

But, this arrangement is not limiting to the present invention, and it is satisfactory if the recording permission pixels and the non-recording-permission pixels are provided to provide the boundary area so that the recording permission ratio of the pixel line in the boundary area changes depending on the position in the main scan direction within the range between the recording permission ratio (15%, for example) of one of the non-boundary area and the recording permission ratio (35%, for example) in the other non-boundary area.

Embodiment 2

Figure 19:
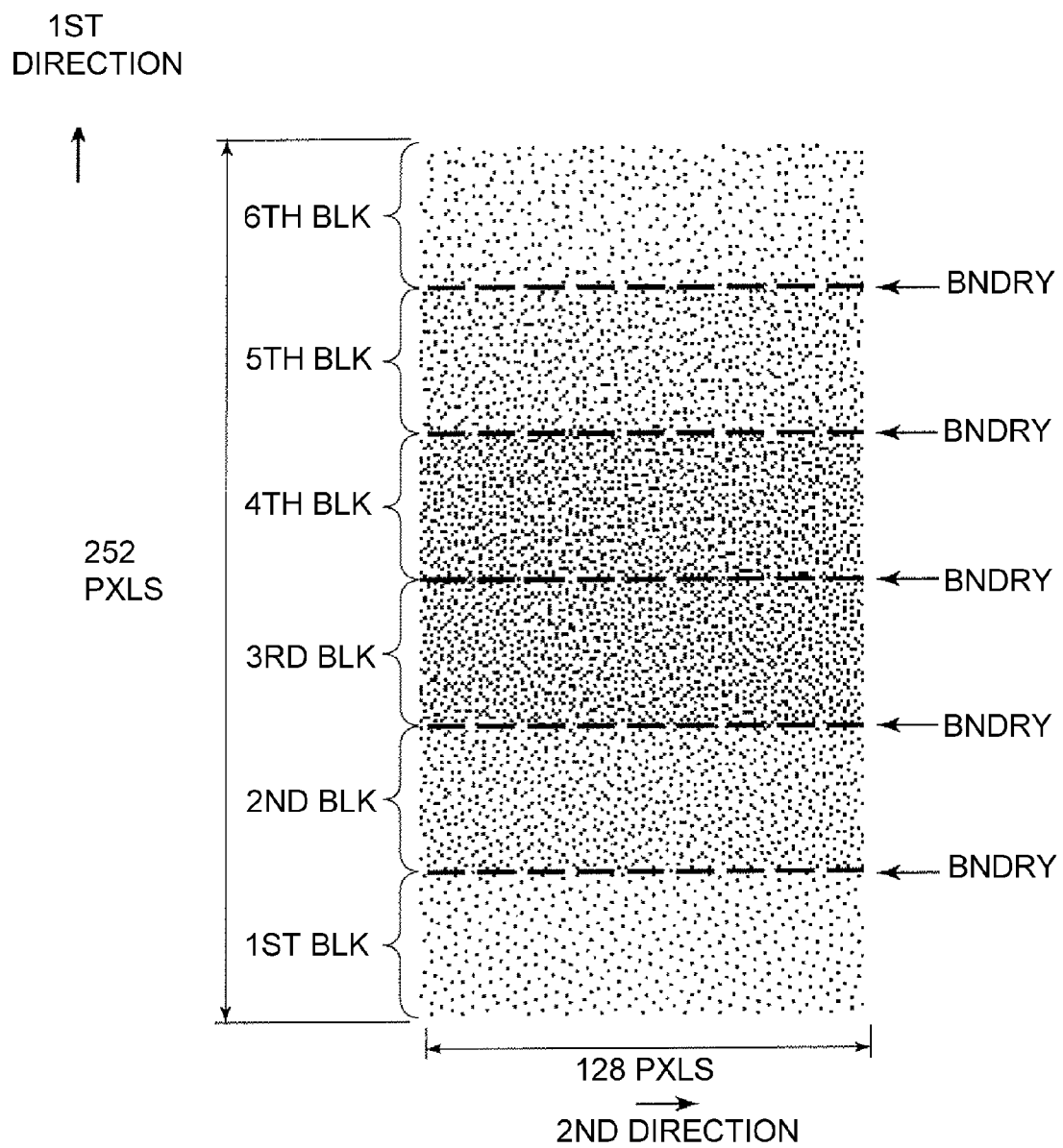
FIG. 19 illustrates an example of a dispersion state of the recording permission pixels of a conventional stepwise mask for 6 path recording.
Figure 20:
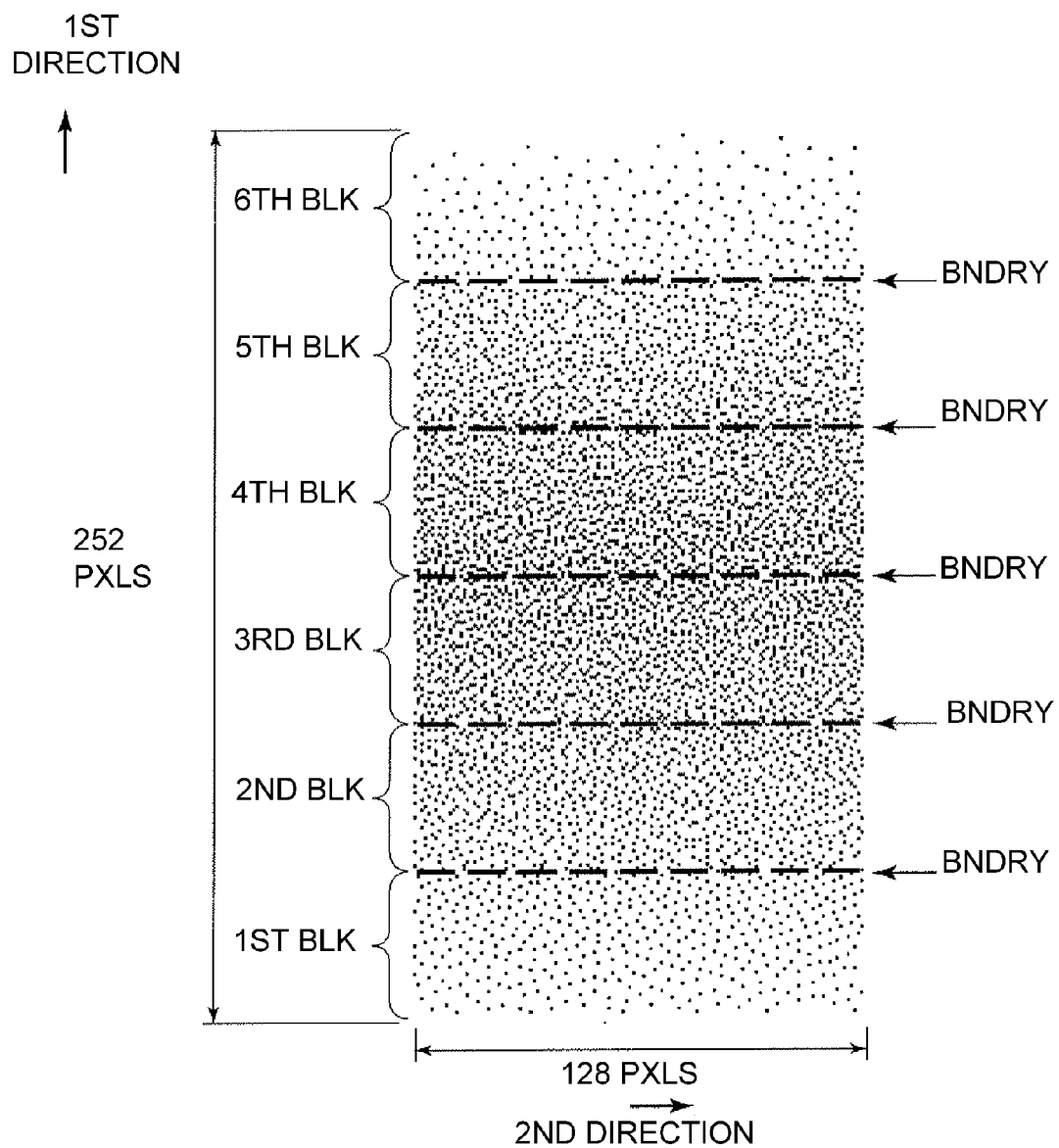
FIG. 20 illustrates an example of a dispersion state of the recording permission pixels of a conventional gradation mask for 6 path recording.
Figure 21:
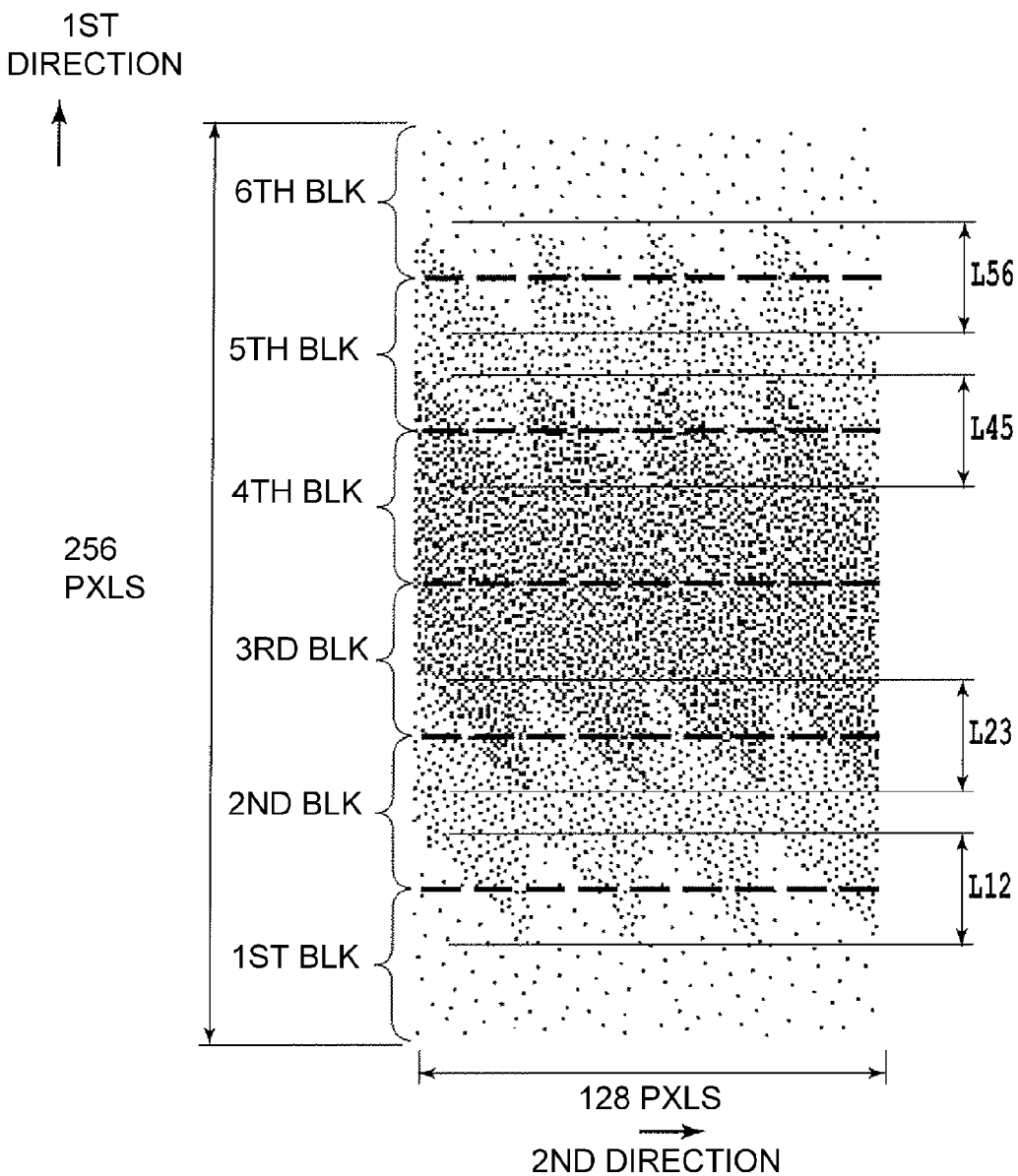
FIG. 21 illustrates a dispersion state of the recording permission pixels of a mask pattern for 6 path recording shown in FIG. 21.

The embodiment employs a mask pattern six-path recording. FIGS. 19-21 show a distribution of recording permission ratios of a plurality of nozzles and a dispersion state of recording permission pixels in the mask patterns of prior art and the present invention.

The nozzle group of this embodiment includes 256 nozzles, but in the case of six-path recording, only continuous 252 nozzles are used in order to make the nozzle numbers in each of the nozzle blocks the same. In such a case, the nozzle groups are divided into six nozzle blocks (first-sixth nozzle blocks) each including 42 nozzles in the first direction, and between adjacent ones of six scans, the recording material is fed through a distance corresponding to the width of one block. By doing so, a unit area of the recording material having the width of one block is recorded by six scans to complete the image. Here, six nozzle blocks are first-sixth blocks. The portions of the mask pattern corresponding to the first-sixth blocks are first-sixth pattern portions.

FIG. 19 illustrates an example of the dispersion state of the recording permission pixels of a stepwise mask for six paths. In the mask pattern of FIG. 19, the recording permission ratios of the first block and the sixth block are 2%, the recording permission ratios of the second block and the fifth block are 15%, and the recording permission ratios of the third block and the fourth block are 33%. The mask pattern of this example has an area of 128 pixels in a main scan direction (second direction) and 252 pixels in a sub-scan direction (first direction). In the case that such a stepwise mask is used, the unit area of the recording material is recorded by the first-sixth blocks up to 2%+15%+33%+33%+15%+2%=100%. As has been described in the BACKGROUND OF THE INVENTION, when the recording is carries out using the stepwise mask shown in FIG. 19, a position (boundary portion) where the recording permission ratio significantly changes results in extending linearly in the second direction (main scan direction). As a result, connecting stripes tend to arise.

FIG. 20 illustrates an example of the dispersion state of the recording permission pixels of a gradation mask for six-path recording. With such a gradation mask, while the recording permission ratios between the nozzle blocks are adjusted to a proper level, the recording permission ratio at the boundary between the nozzle blocks can be made to change gradually and therefore, both of the inter-band unevenness and the connecting stripe can be suppressed. As described in the foregoing, an in-band unevenness may be brought about when the recording permission ratio changes in each nozzle block.

FIG. 21 illustrates the dispersion state of the recording permission pixels of the mask pattern for six-path recording according to the present invention, which mask pattern is provided so as to suppress all of the inter-band unevenness, the connecting stripe and the in-band unevenness. The mask pattern of this embodiment is prepared so as to satisfy all of a first condition for suppressing the inter-band unevenness, a second condition for suppressing the connection strip and a third condition for suppressing the in-band unevenness.

Referring to FIG. 21, in the neighborhood of the boundary between first-sixth pattern portions corresponding to the first-sixth blocks, boundary areas L12, L23, L45 and L56 having an area of 32 pixels (16 pixels for each pattern portion). In the non-boundary areas of the first pattern portion and the sixth pattern portion, the number and distribution of the recording permission pixels are determined such that the ratio of the recording permission pixels in each pixel row is 2%. In the non-boundary areas of the second pattern portion and the fifth pattern portion, the number and distribution of the recording permission pixels are determined such that the ratio of the recording permission pixels in each pixel row is 15%. Furthermore, in the non-boundary areas of the third pattern portion and the fourth pattern portion, the number and the distribution of the recording permission pixels are determined such that the ratio of the recording permission pixels in each pixel row is 33%. In this manner, said mask pattern of FIG. 22 satisfies the above-described first and third conditions.

On the other hand, in the boundary areas L12, L23, L45 and L56, the recording permission ratio of the boundary area changes within the range of the recording permission ratio in the non-boundary areas of the two blocks, the boundary portion being any of the 32 pixels in the boundary area. For example, in the boundary area L12, the boundary portion where the recording permission ratio 2% of the first block and the recording permission ratio 15% of the second block exchange with each other is included in any of 32 pixel width. However, a position of the boundary portion with respect to the first direction changes within the range of 32 pixels in the boundary area L12 depending on the position in the second direction, similarly to the first embodiment. In the mask pattern of the example of FIG. 21, the position of the boundary portion with respect to the first direction changes in the form of sawtooth depending on the position in the second direction. Thus, the boundary portion changes in the first direction, and therefore, in the boundary area L12, the recording permission pixels do not disperse uniformly as contrasted to the non-boundary area.

Figure 22:
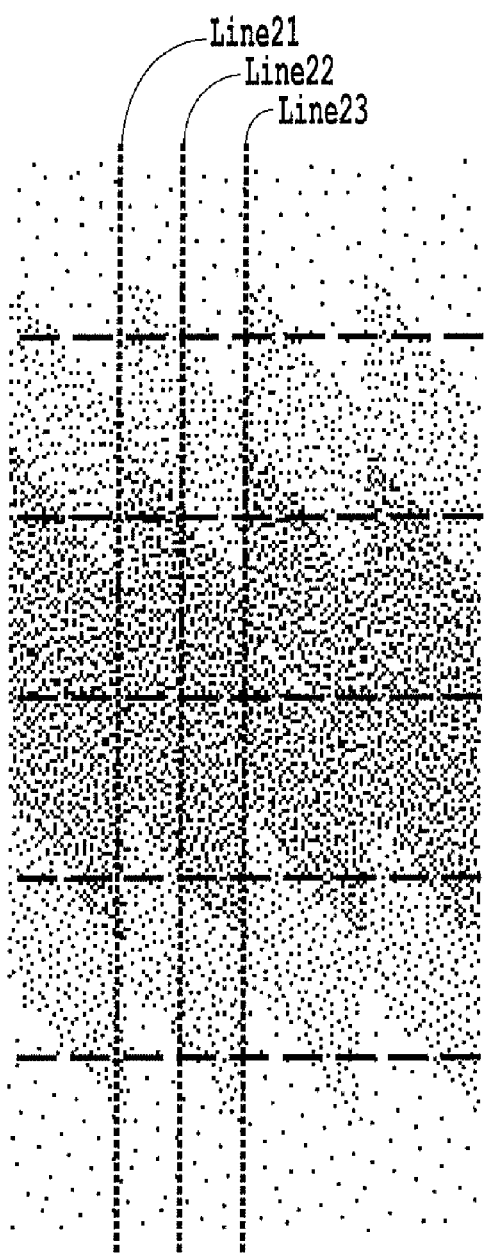
FIG. 22 illustrates a state in which a distribution of the recording permission ratios with respect to the first direction of the mask pattern changes depending on a pixel position with respect to a second direction.
Figure 22:
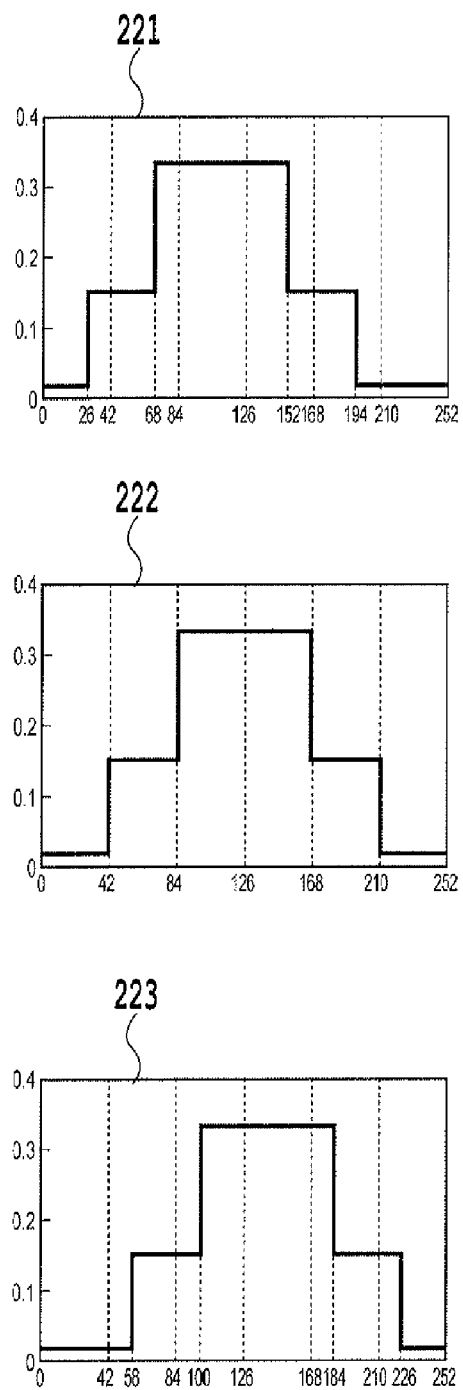

FIG. 22 illustrates a state that the distribution of the recording permission ratios in the first direction changes depending on the pixel position in the second direction in the mask pattern shown in FIG. 21. Designated by reference numerals 221-223 show distributions of the recording permission ratios in and Line3 Line1, Line2 which are pixel lines extending in the first direction. In 221-2123, the abscissa represents pixel positions with respect to the first direction (sub-scan direction), and the point of origin (0) corresponds to the upstream-most (bottom in the Figure) pixel in the sub-scan direction. An ordinate represents the recording permission ratios in the neighborhood area in the pixel positions. In Line21, the recording permission ratio changes from 2% to 15% at the position of 26th pixel, changes from 15% to 33% at the position of 68th pixel, changes from 33% to 15% at the position of 152th pixel, and changes from 15% to 2% at the position of 194th pixel. On the other hand, in Line22, the recording permission ratio changes from 2% to 15% at the position of 42th pixel, changes from 15% to 33% at the position of 84th pixel, changes from 33% to 15% at the position of 168th pixel, and changes from 15% to 2% at the position of 210th pixel. In Line23, the recording permission ratio changes from 2% to 15% at the position of 58th pixel, changes from 15% to 33% at the position of 100th pixel, changes from 33% to 15% at the position of 184th pixel, and changes from 15% to 2% at the position of 226th pixel. In this manner, according to this embodiment, the position of the boundary portion where the recording permission ratio changes among 2%, 15% and 33% is made different depending on the position in the main scan direction (second direction). In addition, in this embodiment, the position of the boundary portion changes periodically and continuously within the range of the boundary area. As a result, according to the embodiment, the second condition in the boundary area that the ratio of the recording permission pixels in each pixel row is within the range between the recording permission ratio of the non-boundary area of one of the pattern portions and the ratio of the recording permission pixels of the non-boundary area of the other pattern portion, and (B) the ratio of the recording permission pixels in the pixel line changes depending on the position with respect to the main scan direction, can be satisfied.

In addition, the mask pattern of this embodiment described with FIG. 21 satisfies the first condition that the recording permission ratios of the plurality of nozzle blocks are adjusted for each block. Also, the third condition that within each nozzle block, the recording permission ratio of the non-boundary area is substantially constant is satisfied. From the foregoing, according to this embodiment, a uniform image substantially free of the inter-band unevenness, the in-band unevenness and the connecting stripe, in a six-path bi-directional recording.

Figure 23:
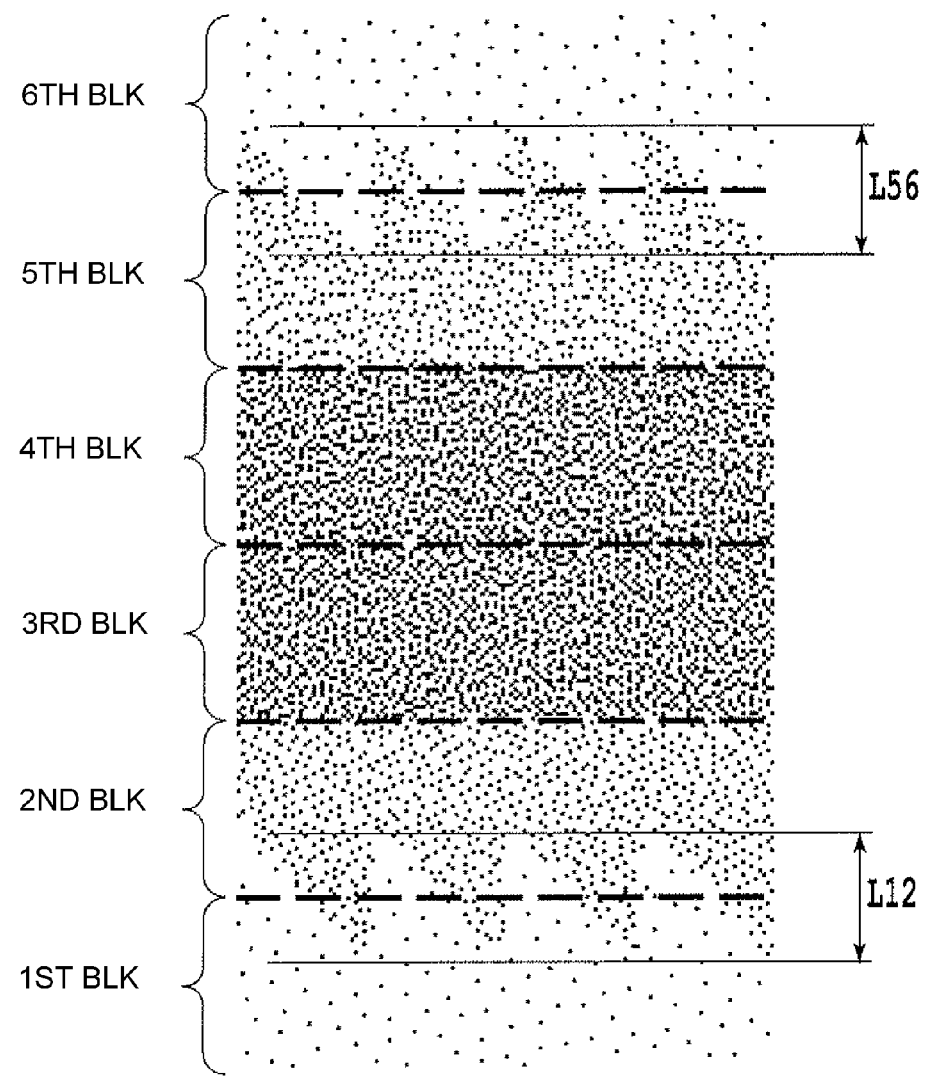
FIG. 23 illustrations an example of a mask pattern partly incorporating a feature of the present invention.
Figure 24:
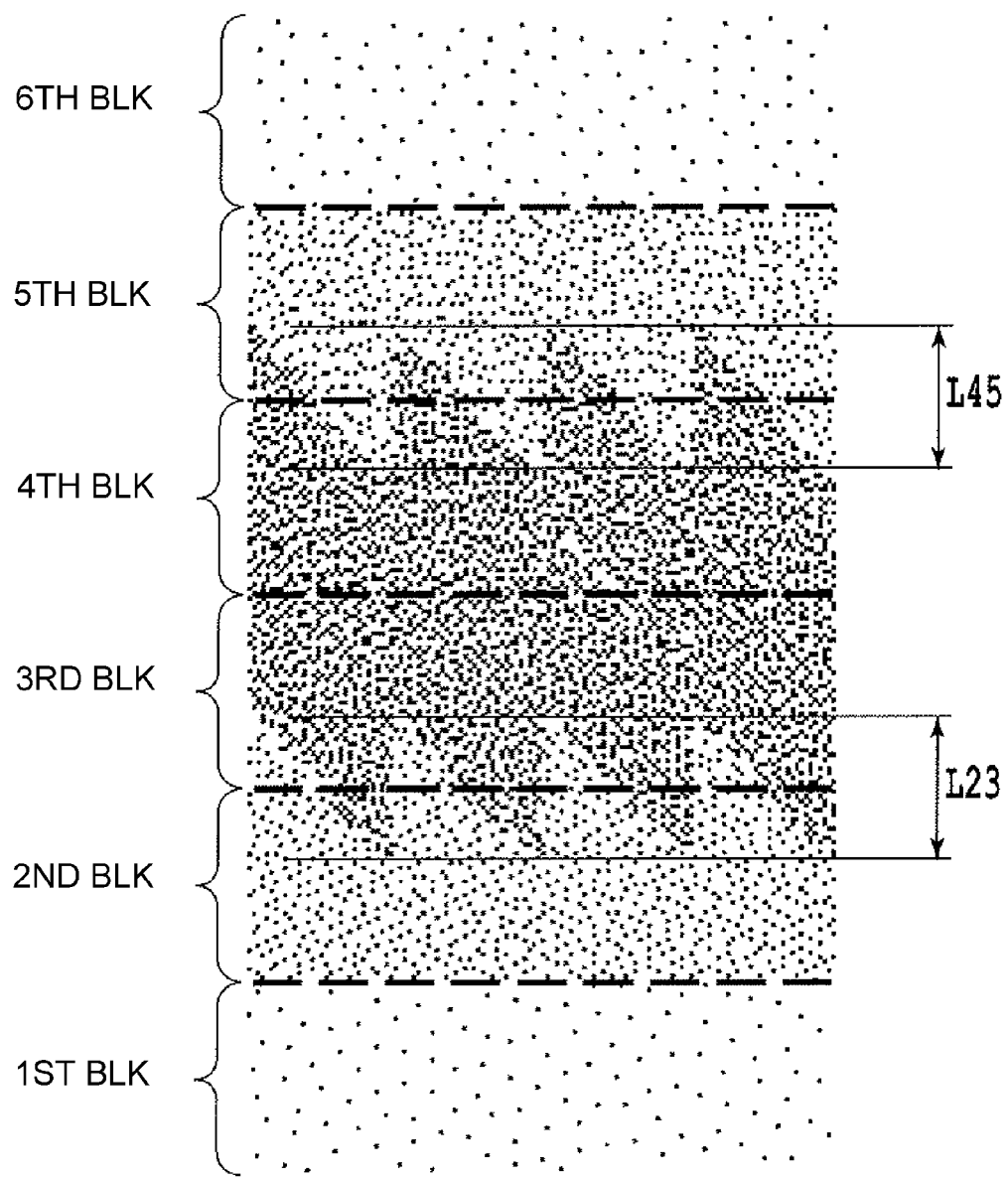
FIG. 24 illustrations an example of a mask pattern partly incorporating a feature of the present invention.

In the foregoing, the description has been made as to the structure of the mask pattern in which the position of the boundary portion changes in all the boundary areas between adjacent blocks having different recording permission ratios relative to each other. However, depending on the conspicuousness of the connecting stripe, the variation of the position of the boundary portion is not necessary in all of the boundary areas. For example, consider the case that the connecting stripe is conspicuous in the boundary between an area having the recording permission ratio of 2% (first recording permission ratio) and an area having the recording permission ratio of 15% (second recording permission ratio), but the connecting stripe is not conspicuous in the boundary between an area having the recording permission ratio of 15% (third recording permission ratio) and an area having the recording permission ratio of 33% (fourth recording permission ratio). In such a case, a mask pattern shown in FIG. 23 in which the feature of the present invention is incorporated partly can be used. In other words, the position of the boundary portion is changed only in the boundary area (L12) and the boundary area, and a conventional stepwise mask may be used in the other boundary areas between adjacent nozzle blocks. On the contrary, in the case that the connecting stripe is not conspicuous in the boundary between 2% and 15% recording permission ratio areas, but the connecting stripe is conspicuous in the boundary between 15% and 33% recording permission ratio areas, the mask pattern shown in FIG. 24 is usable. In other words, the position of the boundary portion is changed only in the boundary area (L23) and boundary area, and the conventional stepwise mask is used in the other boundaries. In the case that the degree of the connecting stripe is not so significant, the structure of the present invention is used only in the boundary area (L12), for example, and the conventional stepwise mask may be used in the other blocks.

As for the changing shape of the boundary portion also in this embodiment, various shapes can be employed similarly to the first embodiment. The amplitude and/or variation cyclic period are not limited to the examples, but various adjustment can be used.

Other Embodiments

Above-described in the foregoing embodiments, the changing shape, the amplitude or the cyclic period in the boundary portion of the mask pattern can be adjusted depending on the conspicuousness of the connecting stripe or the like. The conspicuousness of the image defect or the required image quality are different depending on the kind of the recording material, usage of the print, the distance of observation and so on, even if the same recording apparatus is used. For example, general observation distances are different between a prints of a post card size and a poster. Therefore, the recording apparatus may be provided with a plurality of mask patterns adjusted in accordance with various conditions including the kind and/or size of the recording material, the image quality required by the user and so on and means for operating the apparatus in recording modes using such mask patterns. By doing so, even when the recording condition changes, the user can select and designate an appropriate recording mode at all times.

In the embodiments described in the foregoing, the cyclic period of the change of the boundary portion is not particularly limited, but the results of investigations and confirmations by the inventors have revealed that the cyclic period is preferably not less than 5 pixels in the main scan direction in the case of an apparatus recording an image of 1200 dpi as in the foregoing embodiments. In such a case, however, the configuration may not be constant if the cyclic period of not less than 5 pixels is maintained in the main scan direction. The shapes of the sinusoidal wave, the sawtooth, the arcuation may appear at random, and the amplitude and/or cyclic period may change in various ways.

In the foregoing embodiments, the recording head has a nozzle group including 256 nozzles for each color, and the mask pattern is large enough to cover 128 pixels the first direction)×256 pixels (second direction).

However, the present invention is not limited to such a structure. The number of the nozzles in the nozzle group may be larger than the above, and the size of the mask pattern in the first direction (sub-scan direction) may be the pixel number corresponding to the number of the nozzle used for the recording. The size in the second direction (main scan direction) is not limited to a particular range, but when the change in the boundary portion is periodical, the pixel number is preferably not less than the cyclic period.

In the foregoing description of the embodiments, a color ink jet recording apparatus provided with a recording head having nozzle groups corresponding to four color inks in which the recording is effected while moving the recording head to the X direction has been taken as an example, but the present invention is not limited to such an apparatus. In order to eject more kinds of inks, more than four nozzle groups may be used, and on the other hand, only one nozzle group of black color may be provided. In the case of black color only, no inter-band unevenness appears due to the order of color ink applications, but the inter-band unevenness attributable to a difference in the application timing during a plurality of recording scans, and the present invention is sufficiently advantageous in such a case. When a plurality of inks are used, the conspicuousness of the image defect such as the connecting stripe may be different depending on the ink colors. In such a case, it will be advantageous to prepare the mask patterns for each ink color independently.

Furthermore, in the foregoing description of the embodiments, the execution of a series of image processing steps is shared by the host apparatus 100 and the recording apparatus 104 as shown in FIG. 5, but the present invention is not limited to such a structure. For example, the multi-value data having been subjected to the γ process J0004 may be transferred to the recording apparatus 104, and the recording apparatus 104 may execute the binarization process and the masking process. Further alternatively, all steps up to the masking process J0008 may be executed by the host apparatus, or all the steps after the preliminary part J0002 may be executed by the recording apparatus. In any event, the recording apparatus or recording system wherein the record data later binarization is allotted to the nozzles in accordance with the predetermined recording ratio, and a multi-path recording is effected, is within the present invention.

In the foregoing embodiment, the multi-path recording is accomplished by using a mask pattern in which the permission or non-permission of recording for each pixel is determined beforehand. However, in such a case, the image data provided by logical multiplication of the image data and the mask pattern is allotted to the respective nozzles in the plurality of blocks.

Therefore, the distribution of the image data (recorded pixels) after the allotment is not exactly the same as the distribution of the recording permission ratios of the mask pattern shown in the embodiments. However, generally, when the mask pattern is used, the recording permission ratios of the blocks determined by the mask pattern are substantial the same as a ratio of the actually recording pixels by the blocks by one recording scan. Therefore, the determination of the recording permission ratios of the blocks by the mask pattern is substantially equivalent to the determination of actual recording ratios of the blocks.

INDUSTRIAL APPLICABILITY

As described in the foregoing, according to the present invention, in a recording apparatus and method in which recording material is effected using a recording head, the inter-band unevenness, the connecting stripe and the in-band unevenness can be reduced simultaneously.

The invention claimed is:

1. A recording apparatus for effecting recording on a recording material using a recording head including a plurality of nozzles usable for the recording, the nozzles being arranged in a first direction, said recording apparatus comprising:
   moving means for moving said recording head in a second direction crossing with the first direction;
   feeding means for feeding the recording material in the first direction by a distance corresponding to a width of one of a plurality of nozzle blocks into which said plurality of nozzles are divided, between movements of said recording; and
   control means executing the recording of said recording head during the movement of said recording head in accordance with image data corresponding to said nozzles and a mask pattern for masking the image data;
   wherein (i) said mask pattern includes at least a first pattern portion for masking the image data corresponding to each nozzle of a first nozzle block included in said plurality of nozzle blocks, and a second pattern portion for masking the image data corresponding to each nozzle of a second nozzle block adjacent said first nozzle block,
   (ii) a ratio of recording permission pixels in each pixel row extending in the second direction in a non-boundary area of said first pattern portion is substantially a first value, and a ratio of recording permission pixels in each pixel row extending in the second direction in a non-boundary area of said second pattern portion is substantially a second value which is different from a first value,
   (iii) in a boundary area including a boundary between said first pattern portion and said second pattern portion, a ratio of recording permission pixels in each pixel row extending in the second direction is between the first value and the second value, and the ratios of the recording permission pixels in a pixel line extending in the first direction are different depending on a position with respect to the second direction.

2. A recording apparatus according to claim 1, wherein the ratio of the recording permission pixels in a first pixel line of the boundary area is substantially the first value, and the ratio of the recording permission pixels in a second pixel line of the boundary area is substantially the second value, and the ratio of the recording permission pixels in a third pixel line which is between the first pixel line and the second pixel line with respect to the second direction is between the first value and the second value.

3. A recording apparatus according to claim 1 or 2, wherein said first nozzle block includes a nozzle of said nozzles located at one end portion.

4. A recording apparatus according to any one of claim 1 or 2, wherein said mask pattern further includes a third pattern portion for masking the image data corresponding to each nozzle of a third nozzle block adjacent said second nozzle block,
   (i) the ratio of the recording permission pixels in each pixel row extending in the second direction in a non-boundary area of said third pattern portion is substantially the third value, and
   (ii) the ratio of the recording permission pixels in each pixel row of a boundary area including a boundary between said third pattern portion and said second pattern portion is between the third value and the second value, and the ratios of recording permission pixels in each pixel line the boundary area including the boundary between the third pattern portion and the second pattern portion are different depending on a position with respect to the second direction.

5. A recording apparatus according to claim 1 or 2, wherein said mask pattern includes a third pattern portion for masking the image data corresponding to each nozzle of a third nozzle block adjacent said second nozzle block, a fourth pattern portion for masking the image data corresponding to each nozzle of a fourth nozzle block adjacent said third nozzle block,
  (i) the ratio of the recording permission pixels in each pixel row extending in the second direction in a non-boundary area of said third pattern portion is substantially the second value, and the ratio of the recording permission pixels in each pixel row extending in the second direction in a non-boundary area of said fourth pattern portion is substantially the first value, and
  (ii) the ratio of the recording permission pixels in each pixel row of a boundary area including a boundary between said third pattern portion and said fourth pattern portion is between the first value and the second value, and the ratio of the recording permission pixels in each pixel line extending in the first direction in the boundary area including the boundary between the third pattern portion and the fourth pattern portion is different depending on a position with respect to the second direction.

6. An apparatus according to claim 5, wherein said first nozzle block includes a nozzle of said nozzles located at one end portion, and said fourth nozzle block includes a nozzle of said nozzles located at the other end portion.

7. A recording method for effecting recording on a recording material using a recording head including a plurality of nozzles usable for the recording, the nozzles being arranged in a first direction, said recording method comprising:
  a moving step of moving said recording head in a second direction crossing with the first direction;
  a feeding step of feeding the recording material in the first direction by a distance corresponding to a width of one of a plurality of nozzle blocks into which said plurality of nozzles are divided, between movements of said recording; and
  a recording step of executing the recording of said recording head during the movement of said recording head in accordance with image data corresponding to said nozzles and a mask pattern for masking the image data;
  wherein (i) said mask pattern includes at least a first pattern portion for masking the image data corresponding to each nozzle of a first nozzle block included in said plurality of nozzle blocks, and a second pattern portion for masking the image data corresponding to each nozzle of a second nozzle block adjacent said first nozzle block,
  (ii) a ratio of recording permission pixels in each pixel row extending in the second direction in a non-boundary area of said first pattern portion is substantially a first value, and a ratio of recording permission pixels in each pixel row extending in the second direction in a non-boundary area of said second pattern portion is substantially a second value which is different from a first value, and
  (iii) in a boundary area including a boundary between said first pattern portion and said second pattern portion, a ratio of recording permission pixels in each pixel row extending in the second direction is between the first value and the second value, and the ratios of the recording permission pixels in a pixel line extending in the first direction are different depending on a position with respect to the second direction.

8. A recording method according to claim 7, wherein the ratio of the recording permission pixels in a first pixel line of the boundary area is substantially the first value, and the ratio of the recording permission pixels in a second pixel line of the boundary area is substantially the second value, and the ratio of the recording permission pixels in a third pixel line which is between the first pixel line and the second pixel line with respect to the second direction is between the first value and the second value.

* * * * *